United States Patent
Liu et al.

(10) Patent No.: US 12,489,494 B2
(45) Date of Patent: Dec. 2, 2025

(54) DIVERSITY COMMUNICATION METHOD AND APPARATUS

(71) Applicant: Huawei Technologies Co., Ltd., Guangdong (CN)

(72) Inventors: Fengwei Liu, Chengdu (CN); Minghui Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 337 days.

(21) Appl. No.: 18/192,164

(22) Filed: Mar. 29, 2023

(65) Prior Publication Data
US 2023/0246677 A1 Aug. 3, 2023

Related U.S. Application Data

(63) Continuation of application No. PCT/CN2020/119632, filed on Sep. 30, 2020.

(51) Int. Cl.
*H04B 7/0456* (2017.01)
*H04L 27/26* (2006.01)

(52) U.S. Cl.
CPC ....... *H04B 7/0456* (2013.01); *H04L 27/2601* (2013.01)

(58) Field of Classification Search
CPC ................ H04B 7/0456; H04L 27/2601
USPC ........................................ 370/260
See application file for complete search history.

(56) References Cited

U.S. PATENT DOCUMENTS

| | | |
|---|---|---|
| 9,596,017 B1 | 3/2017 | Mayrench et al. |
| 2011/0142001 A1 | 6/2011 | Ko et al. |
| 2011/0176632 A1 | 7/2011 | Jeong et al. |
| 2012/0076158 A1 | 3/2012 | Ching et al. |

FOREIGN PATENT DOCUMENTS

| | | |
|---|---|---|
| CN | 101431357 A | 5/2009 |
| CN | 105656608 A | 6/2016 |
| CN | 107733617 A | 2/2018 |
| CN | 109716690 A | 5/2019 |
| CN | 110915286 A | 3/2020 |

(Continued)

OTHER PUBLICATIONS

Huawei et al: "Other issues on NR eMIMO in R16." 3GPP TSG RAN WG1 Meeting #98 R1-1909319 Prague, Czech Republic, Aug. 26-30, 2019. total 28 pages.

(Continued)

*Primary Examiner* — Rasha S Al Aubaidi
*Assistant Examiner* — Jirapon Tulop
(74) *Attorney, Agent, or Firm* — WOMBLE BOND DICKINSON (US) LLP

(57) ABSTRACT

This application provides a diversity communication method and apparatus, to provide a diversity transmission solution. A first device maps a plurality of modulation symbols corresponding to one transport block to a plurality of antenna ports, where a plurality of consecutive modulation symbols are mapped to one antenna port in each mapping. Then, the first device maps the modulation symbols on each antenna port to a frequency domain resource corresponding to the antenna port, and frequency domain resources corresponding to different antenna ports do not overlap.

20 Claims, 11 Drawing Sheets

(56) References Cited

FOREIGN PATENT DOCUMENTS

| EP | 3534581 A1 | 9/2019 | |
| WO | WO-2013022260 A2 * | 2/2013 | ......... H04L 27/2636 |

OTHER PUBLICATIONS

3GPP TS 38.211 V16.1.0 (Mar. 2020), 3rd Generation Partnership Project; Technical Specification Group Radio Access Network; NR; Physical channels and modulation(Release 16), 130 pages.

3GPP TS 38.212 V16.1.0 (Mar. 2020), 3rd Generation Partnership Project; Technical Specification Group Radio Access Network; NR; Multiplexing and channel coding(Release 16), 146 pages.

3GPP TS 38.213 V16.1.0 (Mar. 2020), 3rd Generation Partnership Project; Technical Specification Group Radio Access Network;NR;Physical layer procedures for control(Release 16), 156 pages.

3GPP TS 38.214 V16.1.0 (Mar. 2020), 3rd Generation Partnership Project; Technical Specification Group Radio Access Network; NR; Physical layer procedures for data(Release 16), 151 pages.

3GPP TS 38.321 V16.1.0 (Jul. 2020), 3rd Generation Partnership Project; Technical Specification Group Radio Access Network; NR; Medium Access Control (MAC) protocol specification(Release 16), 151 pages.

3GPP TS 38.331 V16.1.0 (Jul. 2020), 3rd Generation Partnership Project;Technical Specification Group Radio Access Network;NR; Radio Resource Control (RRC) protocol specification(Release 16), 906 pages.

3GPP TS 38.133 V16.1.0 (Sep. 2019), 3rd Generation Partnership Project; Technical Specification Group Radio Access Network; NR; Requirements for support of radio resource management(Release 16), 1045 pages.

3GPP TS 38.306 V16.1.0 (Jul. 2020), 3rd Generation Partnership Project; Technical Specification Group Radio Access Network; NR; User Equipment (UE) radio access capabilities(Release 16), 106 pages.

* cited by examiner

DIVERSITY COMMUNICATION METHOD AND APPARATUS

CROSS-REFERENCE TO RELATED APPLICATIONS

This application is a continuation of International Application No. PCT/CN2020/119632, filed on Sep. 30, 2020, the disclosure of which is hereby incorporated by reference in its entirety.

TECHNICAL FIELD

Embodiments of this application relate to the field of wireless communication technologies, and in particular, to a diversity communication method and apparatus.

BACKGROUND

In a mobile communication system, multipath fading occurs in a signal transmitted between a terminal and a base station. As a result, quality of a signal received by a receive end is poor, or a receive end cannot receive a signal. For example, the terminal often operates in a city architectural complex or another complex geographical environment, and moves at any speed and in any direction. After a signal sent by a transmit end (which may be a terminal or a base station) passes through a propagation path such as reflection and scattering, a signal arriving at the receive end is usually a superposition of a plurality of signals with different amplitudes and phases. As a result, an amplitude of the received signal fluctuates randomly, and multipath fading occurs. In addition, when the signal is blocked by a high building (for example, the terminal moves in front of a building that is away from the base station) or a terrain fluctuation, an amplitude of the received signal decreases. In addition, a change of a weather condition also affects the signal propagation, and causes an amplitude and phase of the received signal to change. All of these bring adverse effects on mobile communication.

To improve performance of the mobile communication system, diversity techniques may be used for improving received signal quality. The diversity technique can use a plurality of paths to transmit signals. The plurality of paths are for transmitting same information and have characteristics of approximately equal average signal strength and mutually independent fading. After receiving these signals, the receive end can combine these signals properly to greatly reduce impact of multipath fading and improve transmission reliability.

Based on this, how to perform diversity transmission is a technical problem that needs to be resolved.

SUMMARY

This application provides a diversity communication method, to provide a diversity transmission solution.

In some embodiments, a diversity communication method is provided. A first device maps a plurality of modulation symbols to a plurality of antenna ports, where a plurality of consecutive modulation symbols are mapped to one antenna port in each mapping, and the plurality of modulation symbols are generated based on one transport block. Then, the first device performs the following processing on the modulation symbols on each antenna port: mapping the plurality of modulation symbols to a frequency domain resource, where the frequency domain resource is a frequency domain resource corresponding to the antenna port, and frequency domain resources corresponding to different antenna ports do not overlap.

In this embodiment, one transport block is transmitted through the different antenna ports, and the frequency domain resources corresponding to the different antenna ports do not overlap. In other words, the transport block is transmitted on different channels, and therefore diversity transmission of the transport block is implemented. In addition, when the modulation symbols are mapped to the antenna ports, the plurality of consecutive modulation symbols are mapped each time. In this mapping manner, a phase difference between the plurality of consecutive modulation symbols may be kept undamaged, so that a communication system is enabled to maintain a low peak to average power ratio (PAPR).

In some embodiments, in each mapping, an even number of consecutive modulation symbols are mapped to one antenna port. For example, when the plurality of antenna ports include a first antenna port and a second antenna port, two consecutive modulation symbols are mapped to one antenna port. In some embodiments, the following formula may be used for mapping the plurality of modulation symbols to the plurality of antenna ports:

$$x^{(0)}(i)=d^{(0)}(4i);$$

$$x^{(0)}(i+1)=d^{(0)}(4i+1);$$

$$x^{(1)}(i)=d^{(0)}(4i+2); \text{ and}$$

$$x^{(1)}(i+1)=d^{(0)}(4i+3).$$

$x^{(0)}$ is the first antenna port, $x^{(1)}$ is the second antenna port, $d^{(0)}$ represents the modulation symbol, i, 4i, 4i+1, 4i+2, and 4i+3 are numbers of the modulation symbols, and i is an integer greater than or equal to 0.

In some embodiments, before mapping the plurality of modulation symbols to the plurality of antenna ports, the first device may first modulate a plurality of coded bits of one transport block, to obtain the plurality of modulation symbols.

In some embodiments, before mapping the plurality of modulation symbols corresponding to each antenna port to the frequency domain resource corresponding to the antenna port, the first device may first perform discrete Fourier transform (DFT) on the plurality of modulation symbols corresponding to each antenna port. If the DFT is not performed, an orthogonal frequency division multiplexing (OFDM) signal is finally obtained. If the DFT is performed, a discrete Fourier transform spread orthogonal frequency division multiplexing (DFT-s-OFDM) signal is finally obtained.

In some embodiments, a diversity communication method is provided. A first device processes one transport block to generate a plurality of codewords. Different codewords correspond to different antenna ports, and frequency domain resources corresponding to the different antenna ports do not overlap. Then, the first device performs the following processing on each codeword: modulating bits in the codeword to obtain a plurality of modulation symbols, and mapping the plurality of modulation symbols to a frequency domain resource, where the frequency domain resource is a frequency domain resource corresponding to the antenna port.

In this embodiment, different codewords generated by one transport block are transmitted through different antenna ports. Frequency domain resources corresponding to the different antenna ports do not overlap, and the different codewords pass through different channels. In other words, the transport block is transmitted on the different channels, and therefore diversity transmission of the transport block is implemented. In addition, each codeword may be separately decoded. Therefore, even if one antenna of a receive end experiences severe fading (for example, is blocked), the receive end may further restore the transport block of the first device by using data received through another antenna.

In some embodiments, one codeword is a redundancy version of the transport block. Different codewords may be a same redundancy version or different redundancy versions of a same transport block. A combined receive gain of the different redundancy versions is greater than a combined receive gain of the same version.

In some embodiments, before mapping the plurality of modulation symbols to the frequency domain resource, the first device may first perform discrete Fourier transform DFT on the plurality of modulation symbols. If the DFT is not performed, an orthogonal frequency division multiplexing OFDM signal is finally obtained. If the DFT is performed, a discrete Fourier transform spread orthogonal frequency division multiplexing DFT-s-OFDM signal is finally obtained.

In some embodiments, a frequency domain resource corresponding to each antenna port is inconsecutive; or a frequency domain resource corresponding to each antenna port is consecutive.

In some embodiments, when the frequency domain resource corresponding to each antenna port is inconsecutive, any one of the following is included: the frequency domain resource includes a plurality of resource elements (REs), and the plurality of resource elements REs are inconsecutive, where the REs in this application may be replaced with subcarriers;

the frequency domain resource includes a plurality of precoding resource block groups (precoding resource block groups, PRGs), and the plurality of precoding resource block groups PRGs are inconsecutive; or the frequency domain resource includes a plurality of physical resource blocks (PRBs), and the plurality of physical resource blocks PRBs are inconsecutive.

In some embodiments, an inconsecutive (spaced) part is a frequency domain resource of another antenna port.

In some embodiments, the first device may further receive a first indication, where the first indication indicates a mapping manner of mapping the plurality of modulation symbols to the frequency domain resource. For example, when four mapping manners are included, the first indication may explicitly indicate the mapping manners by using two bits, where 00, 01, 10, and 11 respectively represent four different mapping manners.

In some embodiments, the first device may further receive one or more demodulation reference signal (DMRS) port identifiers.

In some embodiments, when a plurality of DMRS port identifiers are received, the frequency domain resource includes a plurality of inconsecutive resource elements REs (subcarriers). It may also be understood that a mapping manner used by the first device to map the plurality of modulation symbols to the frequency domain resource of the antenna port is: mapping the plurality of modulation symbols to the plurality of inconsecutive REs or subcarriers.

Alternatively, when one DMRS port identifier is received, the frequency domain resource corresponding to each antenna port is consecutive; or the frequency domain resource includes a plurality of inconsecutive precoding resource block groups PRGs; or the frequency domain resource includes a plurality of inconsecutive physical resource blocks PRBs. It may also be understood that a mapping manner used by the first device to map the plurality of modulation symbols to the frequency domain resource of the antenna port is: mapping the plurality of modulation symbols to the consecutive frequency domain resource corresponding to the antenna port; or mapping the plurality of modulation symbols to the plurality of inconsecutive PRGs; or mapping the plurality of modulation symbols to the plurality of inconsecutive PRBs.

In some embodiments, the first device may further receive information about one or more sub-bands, where the information about the sub-band is used for determining the frequency domain resource corresponding to the antenna port. The information about the sub-band may indicate a frequency domain position of the sub-band, or indicate a bandwidth of the sub-band.

In some embodiments, when the information about the sub-band is received, the frequency domain resource corresponding to each antenna port is consecutive. It may also be understood that a mapping manner used by the first device to map the plurality of modulation symbols to the frequency domain resource of the antenna port is: mapping the plurality of modulation symbols to the consecutive frequency domain resource corresponding to the antenna port. This manner may also be referred to as a sub-band mapping manner of the first device mapping the plurality of modulation symbols to the frequency domain resource. Even if the first device receives information about only one sub-band, the first device may derive a frequency domain position of another sub-band according to a rule.

In some embodiments, the first device may further process a frequency domain signal obtained after the frequency domain resource mapping, to obtain an orthogonal frequency division multiplexing OFDM signal or a discrete Fourier transform spread orthogonal frequency division multiplexing (DFT-s-OFDM) signal, and send the OFDM signal or the DFT-s-OFDM signal on a corresponding antenna port.

In some embodiments, a communication apparatus is provided. The apparatus has a function of implementing any of the embodiments discussed herein. These functions may be implemented by hardware, or may be implemented by hardware by executing corresponding software. The hardware or software includes one or more function modules corresponding to the foregoing functions.

In some embodiments, a communication apparatus is provided. The apparatus includes a processor and a memory. The memory is configured to store computer program instructions. The processor is configured to execute some or all of the computer program instructions in the memory. When the some or all of the computer program instructions are executed, the processor is configured to implement functions of the first device in the method according to any of the embodiments discussed herein.

In some embodiments, the apparatus may further include a transceiver, and the transceiver is configured to send a signal processed by the processor, or receive a signal input to the processor. The transceiver may perform a sending action or a receiving action performed by the first device in any of the embodiments discussed herein.

In some embodiments, this application provides a chip system. The chip system includes one or more processors (the processor may also be referred to as a processing circuit). The processor is electrically coupled to a memory (which may also be referred to as a storage medium). The memory may be located in the chip system, or may not be located in the chip system, and the memory is configured to store computer program instructions. The processor is configured to execute some or all of the computer program instructions in the memory. When the some or all of the computer program instructions are executed, the processor is configured to implement functions of the first device in the method according to any of the embodiments discussed herein.

In some embodiments, the chip system may further include an input/output interface, and the input/output interface is configured to output a signal processed by the processor, or receive a signal input to the processor. The input/output interface may perform a sending action or a receiving action performed by the first device in any of the embodiments discussed herein, or perform a sending action or a receiving action performed by the first device in any of the embodiments discussed herein.

In some embodiments, the chip system may include a chip, or may include a chip and another discrete component.

In some embodiments, a computer-readable storage medium is provided and is configured to store a computer program. The computer program includes instructions used for implementing the function in any of the embodiments discussed herein.

In some embodiments, a computer-readable storage medium is configured to store a computer program. When the computer program is executed by a computer, the computer is enabled to perform the method performed by the first device in any of the embodiments discussed herein.

In some embodiments, a computer program product is provided. The computer program product includes computer program code. When the computer program code is run on a computer, the computer is enabled to perform the method performed by the first device in any of the embodiments discussed herein.

DESCRIPTION OF EMBODIMENTS

The following describes in detail embodiments of this application with reference to accompanying drawings.

For ease of understanding the technical solutions in embodiments of this application, the following briefly describes a system architecture of a diversity communication method provided in embodiments of this application. It may be understood that the system architecture described in embodiments of this application is intended to describe the technical solutions in embodiments of this application more clearly, and does not constitute a limitation on the technical solutions provided in embodiments of this application.

The technical solutions in embodiments of this application may be applied to various communication systems, for example, a wireless local area network (WLAN) communication system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5th generation (5G) system or a new radio (NR) system, and a future communication system.

For ease of understanding embodiments of this application, the following describes an application scenario of this application. A network architecture and a service scenario described in embodiments of this application are intended to describe the technical solutions in embodiments of this application more clearly, and do not constitute a limitation on the technical solutions provided in embodiments of this application. Persons of ordinary skill in the art may know that, as a new service scenario emerges, the technical solutions provided in embodiments of this application are also applicable to a similar technical problem.

Figure 1:
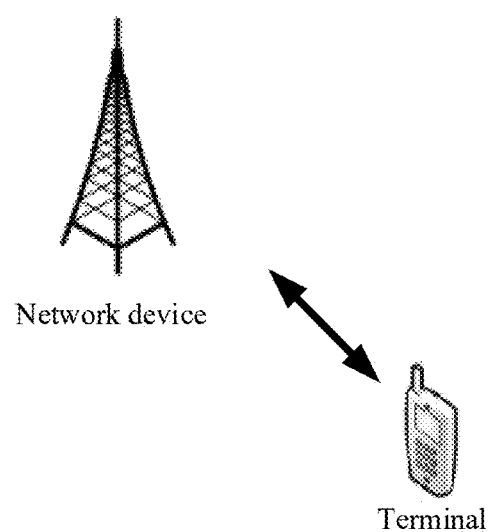
FIG. 1 is a schematic diagram of a communication system according to an embodiment of this application.

A communication system shown in FIG. 1 includes a network device and a terminal. The network device and the terminal may perform wireless communication by using an air interface resource. The air interface resource may include one or more of a time domain resource, a frequency domain resource, a code domain resource, and a space domain resource. In addition, this application may further be applicable to a communication system between terminals or a communication system between network devices.

Figure 2:
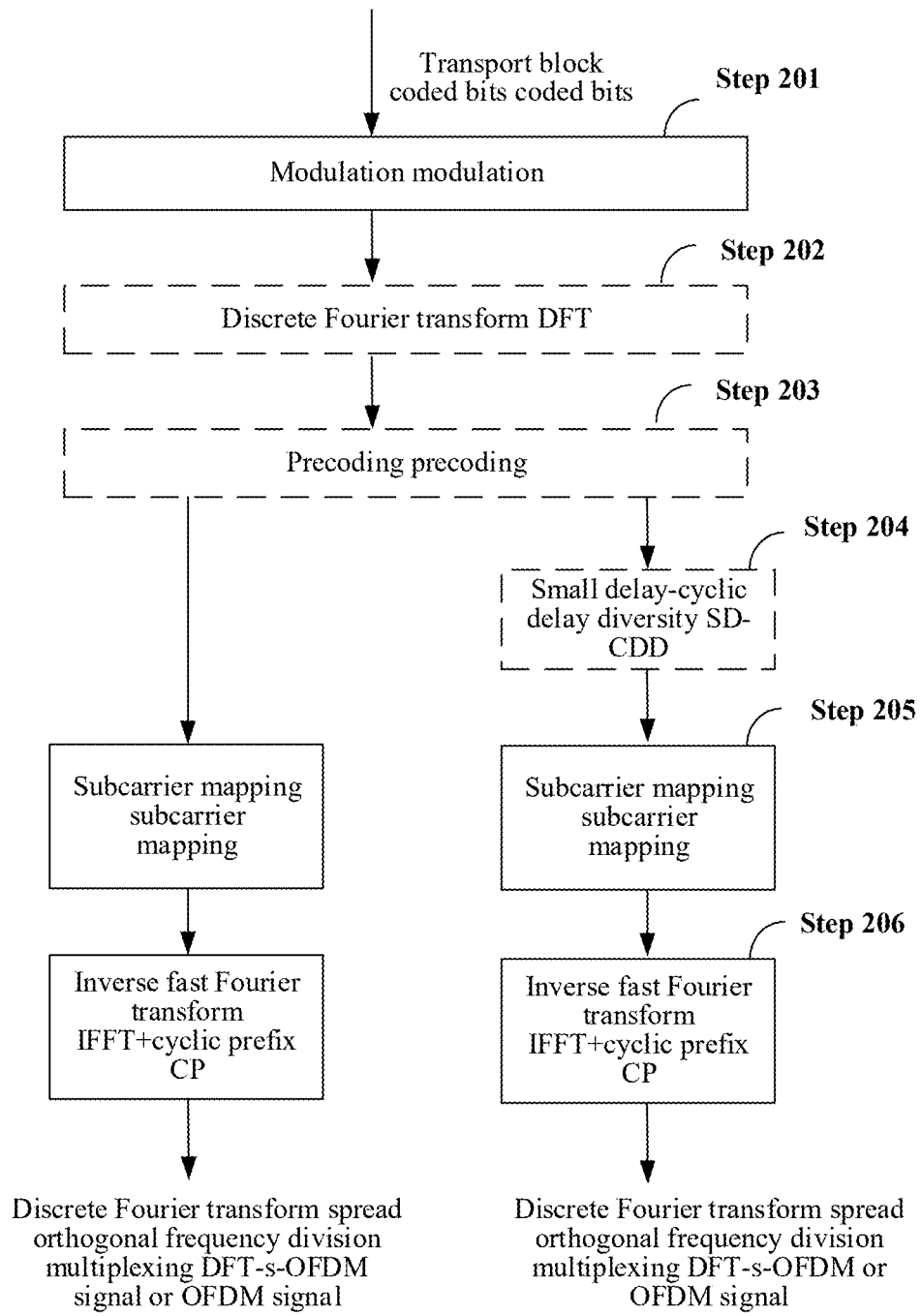
FIG. 2 is a schematic diagram of a process of small delay-cyclic delay diversity SD-CDD diversity communication according to an embodiment of this application.

To improve performance of a mobile communication system, diversity techniques may be used for improving received signal quality. As shown in FIG. 2, a schematic diagram of a process of small delay-cyclic delay diversity (SD-CDD) diversity communication is provided, and the process includes the following operations.

Operation 201: Perform modulation on a plurality of coded bits of a transport block, to obtain a plurality of modulated symbols, where the modulated symbols may be referred to as modulation symbols, and the modulation symbols may also be referred to as complex-valued symbols.

Operation 202: Perform discrete Fourier transform DFT on the plurality of modulation symbols. The DFT operation may also be referred to as transform domain precoding. Operation 202 is optional. If the DFT is not performed, an OFDM signal is finally obtained. If the DFT is performed, a DFT-s-OFDM signal is finally obtained. Each symbol obtained after the DFT may be referred to as a sampling symbol, a complex-valued sampling symbol, a complex-valued symbol, or the like.

Operation 203: Perform precoding on the symbols obtained after the DFT. The precoding herein may be precoding for non-codebook-based transmission, or precoding for codebook-based transmission.

Operation 204: Map precoded symbols to two antenna ports, where the symbols mapped to the two antenna ports are the same. SD-CDD is performed on one of the antennas. Generally, a time domain (cyclic) shift is equivalently caused by frequency domain weighting. In FIG. 2, the two antenna ports are used as an example for description. In an actual application, there may be more antenna ports, for example, four or eight antenna ports. In some embodiments, the symbols obtained in operation 202 may be directly mapped to a plurality of antenna ports without being precoded in operation 203. Therefore, operation 203 is optional.

Operation 205: Map the symbols on each antenna port to a frequency domain resource corresponding to the antenna port, in some embodiments, perform subcarrier mapping. It should be noted that the frequency domain resources corresponding to the two antenna ports are the same.

Operation 206: Perform operations such as inverse fast Fourier transform (IFFT) and cyclic prefix (CP) addition on a frequency domain signal obtained after the frequency domain resource mapping, to obtain the DFT-s-OFDM signal or the OFDM signal. Then, the DFT-s-OFDM signal or the OFDM signal may be sent through a corresponding antenna port.

In the SD-CDD diversity communication solution, the two channels of signals are completely the same, although the two signals are sent in sequence after the SD-CDD operation in operation 204, time domain resources occupied by the two channels of signals are still the same. That the two signals are sent in sequence herein is caused by different sampling points rather than different time domain resources.

A principle of obtaining a diversity by using the SD-CDD is to use a plurality of antenna ports to send signals at different time points, to improve channel frequency selectivity. This enables a receive end to obtain a higher frequency-domain diversity gain. In other words, an antenna diversity is converted into a frequency domain diversity by using the SD-CDD. However, the SD-CDD technology also has some disadvantages. For example, a performance gain depends on a channel condition. When frequency selectivity of a channel strong, a gain obtained by using the SD-CDD is small. For another example, a gain obtained in a DFT-s-OFDM waveform is small. For still another example, when there is a small bandwidth and small cyclic shift space, it is difficult to obtain a gain. For yet another example, channel delay spread is increased by using the SD-CDD, and consequently channel estimation performance deteriorates.

Based on this, this application further provides a plurality of diversity communication solutions. In the diversity solutions provided in this application, a transmit antenna port diversity gain can be obtained in both an OFDM waveform and a DFT-s-OFDM waveform, and the provided solutions are slightly affected by factors such as a channel condition and a bandwidth size. A stable diversity gain can be provided in various application scenarios.

For ease of understanding embodiments of this application, the following describes a part of terms in embodiments of this application, to help persons skilled in the art have a better understanding.

(1) A network device is a device capable of providing a random access function for a terminal device or a chip that can be disposed in the device. The device includes but is not limited to an evolved NodeB (eNB), a radio network controller (RNC), a NodeB (NB), a base station controller (BSC), a base transceiver station (BTS), a home base station (for example, home evolved NodeB or home NodeB, HNB), a baseband unit (BBU), an access point (AP) in a wireless fidelity (Wi-Fi) system, a wireless relay node, a wireless backhaul node, a transmission and reception point (TRP), or transmission point (TP), or the like, or may be a gNB or a transmission point (TRP or TP) in a 5G system such as an NR system or one antenna panel or one group of antenna panels (including a plurality of antenna panels) of a base station in a 5G system, or may be a network node forming a gNB or a transmission point, for example, a baseband unit (BBU) or a distributed unit (DU).

(2) A terminal device, also referred to as user equipment (UE), a mobile station (MS), a mobile terminal (MT), a terminal, or the like, is a device that provides voice and/or data connectivity for users. For example, the terminal device includes a handheld device or a vehicle-mounted device that has a wireless connection function. Currently, the terminal device may be a mobile phone, a tablet computer, a laptop computer, a palmtop computer, a mobile Internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, a wireless terminal in vehicle-to-vehicle (V2V) communication, or the like.

(3) Diversity techniques use a plurality of signal paths to transmit information. Signals are properly combined at a receive end to greatly reduce impact of multipath fading. Therefore, transmission reliability is improved. The plurality of signal paths have characteristics of transmitting same information, having approximately equal average signal strength, and fading independently of each other. Simply speaking, if a path experiences deep fading, and another relatively independent path may still include a relatively strong signal, two or more signals may be selected from a plurality of signals for combination. In this way, an instantaneous signal-to-noise ratio and an average signal-to-noise ratio at a receive end may be improved.

(4) Antenna port: An antenna is an apparatus that can effectively radiate an electromagnetic wave to a particular direction in space or receive an electromagnetic wave from a particular direction in space.

An antenna port in 3GPP protocol 36.211 (LTE) and 38.211 (NR) is defined as follows: A channel through which one symbol is transmitted through one antenna port may be derived from a channel through which another symbol is transmitted through the same antenna port.

The antenna port in 3GPP may also be referred to as a logical antenna port. A correspondence between the antenna port and a physical antenna may be implemented in a plurality of manners.

In a possibility, a number of antenna ports is equal to a number of physical antennas and the antenna ports are in a one-to-one correspondence to the physical antennas.

In a possibility, a number of antenna ports is equal to a number of physical antennas but the antenna ports are not in a one-to-one correspondence to the physical antennas. For example, an antenna port signal obtained after precoding is mapped to the physical antenna.

In a possibility, a number of antenna ports is less than a number of physical antennas. For example, one antenna port may correspond to an array including a plurality of physical antennas.

The antenna port mentioned in this application is similar to the antenna port defined in the 3GPP protocol, and may be considered as a channel identification method. The antenna port in this application may be a physical antenna port, or may be a logical antenna port. In this application, when the antenna port is a logical antenna port, one logical antenna port corresponds to one or more physical antenna ports, different logical antenna ports correspond to different physical antenna ports, and overlapping between the physical antenna ports corresponding to the different logical antenna ports is allowed.

(5) Redundancy version (RV): To support hybrid automatic repeat request (HARQ) based on incremental redundancy (IR), LTE and NR support a redundancy version mechanism. To understand the redundancy version, an NR channel coding processing procedure is first described: UE or a base station generates a to-be-transmitted transport block (TB), and one TB includes several to-be-transmitted bits. A transmit end first performs CRC addition on the TB, and then performs code block segmentation and CRC addition at a code block level. Then, the transmit end performs LDPC coding on each code block (in the LTE, the transmit end executes turbo coding, or the transmit end may use another coding scheme such as polar in another communication system). After the LDPC coding, the transmit end performs rate matching based on a redundancy version ID (rv_id), to generate different code block redundancy versions. Different redundancy versions of a same TB or CB have different content, but all include information about an original TB or CB. The redundancy version may be referred to as a redundancy version of the TB, a redundancy version of the CB, or a redundancy version of a codeword (CW). A plurality of CBs obtained after the rate matching form a complete to-be-transmitted bit block by using code block concatenation. For uplink transmission, the to-be-transmitted data bit block may be reused with uplink control information for transmission. In a single time of transmission, the transmit end generally sends one redundancy version of the TB or the CB. If a receive end fails to decode the redundancy version of the TB or the CB, the transmit end may send another redundancy version of the TB or the CB again. After obtaining a plurality of redundancy versions of the TB or the CB, the receive end may perform combined decoding. A power gain can be obtained through repeated transmission of a same redundancy version, and a power gain and an additional coding gain can be obtained through repeated transmission of different redundancy versions, improving retransmission performance. In NR, a redundancy version used for each transmission is indicated by a base station to UE, and the UE performs coding rate matching or decoding rate dematching based on a redundancy version ID.

(6) Peak to average power ratio (PAPR):

An amplitude of a radio signal changes continuously in time domain. Therefore, an instantaneous transmit power of the radio signal is not constant. The peak to average power ratio PAPR is referred to as a peak-to-average ratio for short. The peak to average power ratio may be a ratio, in a symbol, of an instantaneous power peak value of continuous signals to an average signal power value. The peak to average power ratio may be represented by using the following formula:

$$PAPR = 10 \cdot \log_{10}\left(\frac{\max(X_i^2)}{\mathrm{mean}(X_i^2)}\right).$$

$X_i$ represents time domain discrete values of a group of sequences, $\max(X_i^2)$ represents a largest value of squares of the time domain discrete values, and $\mathrm{mean}(X_i^2)$ represents an average value of the squares of the time domain discrete values.

An OFDM symbol is formed by superposing a plurality of independently modulated subcarrier signals. Therefore, when phases of subcarriers are the same or similar, the superposed signals are modulated by signals with a same initial phase, to generate a larger instantaneous power peak value. As a result, a higher PAPR is generated. The higher PAPR causes non-linear distortion of the signals, obvious spectrum spread interference, and in-band signal distortion. Consequently, system performance is reduced.

(7) A layer mapping manner of MIMO transmission in an existing communication system is shown in Table 1. x represents a layer, a superscript of x represents a layer index, a superscript of d represents a codeword number, $d^{(0)}$ represents a modulation symbol, i, 2i, 2i+1, 3i, 3i+1, 3i+2, and the like are numbers of modulation symbols, and i is an integer greater than or equal to 0. One codeword may be considered as a bit set. For example, one codeword includes 2400 bits. M represents a number of symbols at each layer.

TABLE 1

Codeword-to-layer mapping for spatial multiplexing (codeword-to-layer mapping for spatial multiplexing).

| Number of layers Number of layers | Number of codewords Number of codewords | Codeword-to-layer mapping Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 3 | 1 | $x^{(0)}(i) = d^{(0)}(3i)$ $x^{(1)}(i) = d^{(0)}(3i + 1)$ $x^{(2)}(i) = d^{(0)}(3i + 2)$ | $M_{symb}^{layer} = M_{symb}^{(0)}/3$ |
| 4 | 1 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ | $M_{symb}^{layer} = M_{symb}^{(0)}/4$ |

The following describes the solutions in detail with reference to the accompanying drawings. Features or content denoted by dashed lines in the accompanying drawings may be understood as optional operations or optional structures in embodiments of this application.

Figure 3:
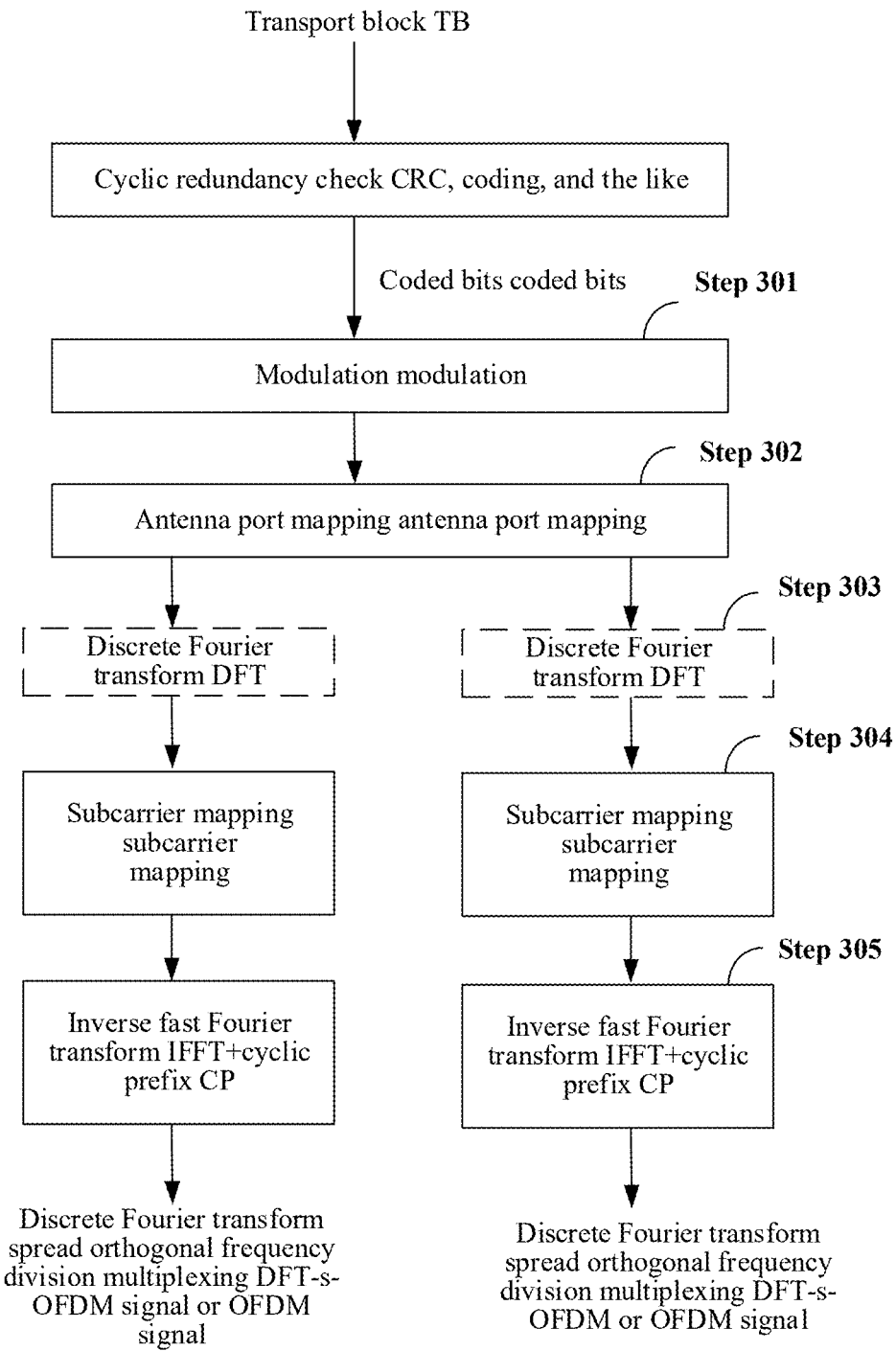
FIG. 3 is a schematic diagram of a diversity communication process according to an embodiment of this application.

As shown in FIG. 3, a schematic diagram of a diversity communication process is provided. An example in which a first device sends data to a second device is used for description. In an example, the first device is a terminal, and the second device is a network device. In an example, the first device is a network device, and the second device is also a network device. In another example, the first device is a terminal, and the second device is also a terminal.

FIG. 3 includes the following operations.

Operation 301: The first device performs modulation on a plurality of bits (coded bits) obtained after processing such as coding on a transport block (TB), to obtain a plurality of modulation symbols. The modulation symbol may also be referred to as a complex-valued symbol.

When the first device has data to be sent to the second device, the first device may perform operations such as cyclic redundancy check (CRC) addition, channel coding, code block segmentation, rate matching, data control multiplexing, and scrambling on the transport block, to obtain the plurality of coded bits, and then modulate the coded bits, that is, perform constellation diagram mapping, to obtain the plurality of modulation symbols.

The following describes several supported modulation schemes in this application, as shown in Table 2.

TABLE 2

Supported modulation schemes.

| Transform precoding disabled | | Transform precoding enabled | |
| --- | --- | --- | --- |
| Modulation scheme | Modulation order $Q_m$ | Modulation scheme | Modulation order $Q_m$ |
| | | π/2-BPSK | 1 |
| QPSK | 2 | QPSK | 2 |
| 16 QAM | 4 | 16 QAM | 4 |
| 64 QAM | 6 | 64 QAM | 6 |
| 256 QAM | 8 | 256 QAM | 8 |

In Table 2, Transform precoding disabled corresponds to an OFDM signal, and Transform precoding enabled corresponds to a DFT-s-OFDM signal. In addition to the modulation schemes described in Table 2, this application may further support other modulation schemes, for example, BPSK, pi/4-QPSK, 1024QAM, OQAM, and APSK. The modulation scheme is not limited in this application.

Operation 302: The first device maps the plurality of modulation symbols to a plurality of antenna ports. It may also be understood that the plurality of modulation symbols are divided into a plurality of groups (a plurality of channels) of modulation symbols, and each group (channel) corresponds to one antenna port.

In this application, there may be 2, 3, 4, or more antenna ports. The antenna port in this application may be a physical antenna port, or may be a logical antenna port. When the antenna port is a logical antenna port, one logical antenna port corresponds to one or more physical antenna ports, different logical antenna ports correspond to different physical antenna ports, and overlapping between the physical antenna ports corresponding to the different logical antenna ports is allowed. Signals transmitted through different antenna ports pass through different channels.

For example, there are 1200 to-be-transmitted modulation symbols (that is, the modulation symbols obtained in operation 301) in total, and the to-be-transmitted modulation symbols are mapped to two antenna ports. The two antenna ports are a first antenna port and a second antenna port respectively. 600 symbols of the to-be-transmitted modulation symbols may be mapped to the first antenna port, and the remaining 600 symbols may be mapped to the second antenna port. It should be understood that a same number of modulation symbols, or different numbers of modulation symbols may be mapped to different antenna ports.

In an example, in each mapping, one modulation symbol may be mapped to one antenna port. In this embodiment, only a single-codeword scenario is considered.

When there are two antenna ports in this application, a mapping manner of mapping the modulation symbols to the antenna ports is:

$$x^{(0)}(i)=d^{(0)}(2i)$$

$$x^{(1)}(i)=d^{(0)}(2i+1)$$

When there are three antenna ports in this application, a mapping manner of mapping the modulation symbols to the antenna ports is:

$$x^{(0)}(i)=d^{(0)}(3i)$$

$$x^{(1)}(i)=d^{(0)}(3i+1)$$

$$x^{(2)}(i)=d^{(0)}(3i+2)$$

When there are four antenna ports in this application, a mapping manner of mapping the modulation symbols to the antenna ports is:

$$x^{(0)}(i)=d^{(0)}(4i)$$

$$x^{(1)}(i)=d^{(0)}(4i+1)$$

$$x^{(2)}(i)=d^{(0)}(4i+2)$$

$$x^{(3)}(i)=d^{(0)}(4i+3)$$

x represents the antenna port, a superscript of x represents an index of the antenna port, a superscript of d represents a codeword number, $d^{(0)}$ represents the modulation symbol, i, 2i, 2i+1, 3i, 3i+1, 3i+2, 4i, 4i+1, 4i+2, and 4i+3 are numbers of the modulation symbols, and i is an integer greater than or equal to 0.

The foregoing antenna port mapping manner is similar to the layer mapping manner of the MIMO transmission. In the conventional technology, after the layer mapping is performed, the antenna port mapping needs to be further performed. A symbol of one layer may be mapped to one or more antenna ports, and frequency domain resources of the plurality of antenna ports are the same.

Figure 4A:
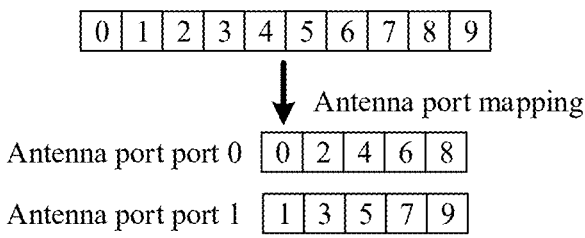
FIG. 4a and FIG. 4b each are a schematic diagram of antenna port mapping according to an embodiment of this application.

As shown in FIG. 4a, a manner of mapping the modulation symbols to two antenna ports is provided. In some embodiments, in each mapping, one modulation symbol may be mapped to one antenna port. In other words, the modulation symbols are alternately mapped to the different antenna ports. In an example in which there are 10 modulation symbols, modulation symbols numbered 0, 2, 4, 6, and 8 are mapped to one antenna port (port 0), and modulation symbols numbered 1, 3, 5, 7, and 9 are mapped to the other antenna port (port 1).

In another example, in each mapping, a plurality of consecutive modulation symbols may be mapped to one antenna port.

For a pi/2-BPSK modulation scheme of a DFT-s-OFDM waveform, a phase difference between pi/2-BPSK symbols is always pi/2 or –pi/2, so that a low PAPR can be implemented. If a manner of alternate mapping of one modulation symbol is used (as shown in FIG. 4a), the characteristic that the phase difference is always pi/2 or –pi/2 is damaged, and a phase difference between the consecutive modulation symbols changes to pi or –pi. This severely deteriorates a PAPR of a sent signal. To ensure compatibility with the pi/2-BPSK modulation scheme, in each mapping, an even number of consecutive modulation symbols may be mapped to one antenna port. The even number herein may be half of a number of modulation symbols in an OFDM symbol (or a DFT-s-OFDM symbol), half of a total number of modulation symbols transmitted on a single PUSCH channel, or the like. For example, there may be two, four, or eight consecutive modulation symbols.

Certainly, an odd number of consecutive modulation symbols may also be mapped to one antenna port. The odd number herein may be, for example, three, five, or seven.

The following uses two antenna ports as an example, and in each mapping, two consecutive modulation symbols are mapped to one antenna port for description. In this manner, a number of codewords Number of codewords is still 1. In some embodiments, the plurality of modulation symbols may be mapped to the plurality of antenna ports by using the following formula. It may also be understood that the plurality of modulation symbols are mapped to the plurality of channels or the plurality of groups of modulation symbols, and each channel or each group corresponds to one antenna port.

$$x^{(0)}(i)=d^{(0)}(4i);$$

$$x^{(0)}(i+1)=d^{(0)}(4i+1);$$

$$X^{(1)}(i)=d^{(0)}(4i+2);$$

$$x^{(1)}(i+1)=d^{(0)}(4i+3);\ \text{and}$$

$x^{(0)}$ is the first antenna port, $x^{(1)}$ is the second antenna port, $d^{(0)}$ represents the modulation symbol, i, 4i, 4i+1, 4i+2, and 4i+3 are numbers of the modulation symbols, and i is an integer greater than or equal to 0.

Figure 4B:
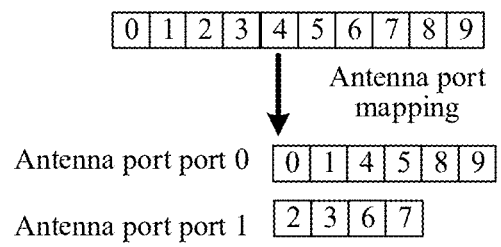

As shown in FIG. 4b, a manner of mapping the modulation symbols to two antenna ports is provided. In some embodiments, in each mapping, two consecutive modulation symbols may be mapped to one antenna port. In other words, the modulation symbols are alternately mapped to the different antenna ports by using two modulation symbols as a group. In an example in which there are 10 modulation symbols, modulation symbols numbered 0, 1, 4, 5, 8, and 9 are mapped to one antenna port (port 0), and modulation symbols numbered 2, 3, 6, and 7 are mapped to the other antenna port (port 1).

The two antenna ports described above may also be replaced with layers. For details, refer to Table 3.

TABLE 3

| Number of layers (Number of layers or number of antenna ports (groups)) | Number of codewords Number of codewords | Codeword-to-layer mapping Codeword-to-layer mapping $i = 0, 1, \ldots, M_{symb}^{layer} - 1$ |
|---|---|---|
| 2 | 1 | $x^{(0)}(i) = d^{(0)}(4i)$    $M_{symb}^{layer} = M_{symb}^{(0)}/2$ <br> $x^{(1)}(i) = d^{(0)}(4i + 1)$ <br> $x^{(2)}(i) = d^{(0)}(4i + 2)$ <br> $x^{(3)}(i) = d^{(0)}(4i + 3)$ |

Although the mapping manner of the even number of consecutive symbols is mainly used for maintaining the low PAPR of pi/2-BPSK, to simplify a process, the mapping manner of the even number of symbols may also be applied to another modulation scheme of the DFT-s-OFDM waveform, or may be applied to modulation of the OFDM signal. In this application, the modulation scheme and the manner of mapping the modulation symbols to the antenna port are not limited. The following Table 4 provides only a combination manner of a plurality of modulation symbol mapping manners that can maintain good communication performance.

TABLE 4

| | OFDM | DFT-s-OFDM except for pi/2-BPSK | DFT-s-OFDM with pi/2-BPSK |
|---|---|---|---|
| Combination 1 | Alternate mapping of a single modulation symbol | Alternate mapping of an even number of consecutive modulation symbols | Alternate mapping of an even number of consecutive modulation symbols |
| Combination 2 | Alternate mapping of a single modulation symbol | Alternate mapping of a single modulation symbol | Alternate mapping of an even number of consecutive modulation symbols |
| Combination 3 | Alternate mapping of an even number of consecutive modulation symbols | Alternate mapping of an even number of consecutive modulation symbols | Alternate mapping of an even number of consecutive modulation symbols |

In another possible implementation, to maintain the low PAPR characteristic of pi/2-BPSK, the transmit end (the first device) uses enhanced pi/2-BPSK modulation. In some embodiments, when there are M antenna ports, a pi/2-BPSK modulation symbol maintains a same phase in M symbols, and a pi/2 phase shift is performed between the M symbols. In this way, the antenna port mapping may reuse the existing layer mapping, in some embodiments, the modulation symbols are mapped to different antenna ports or layers one by one, and the phase-shift characteristic of pi/2-BPSK is retained at each antenna port.

An existing pi/2-BPSK modulation formula is:

$$d(i) = \frac{e^{j\frac{\pi}{2}(i \bmod 2)}}{\sqrt{2}}((1 - 2b(i)) + j(1 - 2b(i))).$$

An enhanced pi/2-BPSK modulation formula provided in this application may be:

$$d(i) = \frac{e^{j\frac{\pi}{2}(\lfloor i/M \rfloor \bmod 2)}}{\sqrt{2}}((1-2b(i)) + j(1-2b(i))), \text{ or} \quad \text{Formula 1}$$

$$d(i) = \frac{e^{j\frac{\pi}{2}(\lfloor i/M \rfloor \bmod 4)}}{\sqrt{2}}((1-2b(i)) + j(1-2b(i))), \quad \text{Formula 2}$$

M is a number of antennas (or a number of layers), M is an integer greater than or equal to 2, b represents a bit sequence, and a value of b is 0 or 1, d is a signal obtained after pi/2 BPSK modulation, i is numbered from 0, i is an integer greater than or equal to 0, $\lfloor i/M \rfloor$ represents performing a floor operation on i M, j is an imaginary part, and j*j=−1.

In some embodiments, M is 2. In other words, the foregoing formula is applicable to mapping of two transmit ports or two-layer mapping.

In some embodiments, M is 4. In other words, the foregoing formula is applicable to mapping of four transmit ports or four-layer mapping.

If ((1−2b(i))+j(1−2b(i)))/sqrt(2) is understood as a BPSK sequence, it can be learned from the foregoing formula that:
when i=0, 1, . . . , M−1, a phase shift of a pi/2 BPSK sequence relative to the BPSK sequence is 0; or
when i=M, M+1, . . . , 2M−1, a phase shift of a pi/2 BPSK sequence relative to the BPSK sequence is pi/2.

The following describes the phase shift of pi/2 in a unit of M.

When M is 2, in the formula 1, $\lfloor i/M \rfloor$ mod 2 corresponding to i=0 to i=15 is respectively 0, 0, 1, 1, 0, 0, 1, 1, 0, 0, 1, 1, 0, 0, 1, and 1. In some embodiments, the phase shift relative to the BPSK sequence is respectively 0, 0, pi/2, pi/2, 0, 0, pi/2, pi/2, 0, 0, pi/2, pi/2, 0, 0, pi/2, and pi/2.

When M is 4, in the formula 1, $\lfloor i/M \rfloor$ mod 2 corresponding to i=0 to i=15 is respectively 0, 0, 0, 0, 1, 1, 1, 1, 0, 0, 0, 0, 1, 1, 1, and 1. In some embodiments, the phase shift relative to the BPSK sequence is respectively 0, 0, 0, 0, pi/2, pi/2, pi/2, pi/2, 0, 0, 0, 0, pi/2, pi/2, pi/2, and pi/2.

When M is 2, in the formula 2, $\lfloor i/M \rfloor$ mod 4 corresponding to i=0 to i=15 is respectively 0, 0, 1, 1, 2, 2, 3, 3, 0, 0, 1, 1, 2, 2, 3, and 3. In some embodiments, the phase shift relative to the BPSK sequence is respectively 0, 0, pi/2, pi/2, pi, pi, 3pi/2, 3pi/2, 0, 0, pi/2, pi/2, pi, pi, 3pi/2, and 3pi/2.

When M is 4, in the formula 2, $\lfloor i/M \rfloor$ mod 4 corresponding to i=0 to i=15 is respectively 0, 0, 0, 0, 1, 1, 1, 1, 2, 2, 2, 2, 3, 3, 3, and 3. In some embodiments, the phase shift relative to the BPSK sequence is respectively 0, 0, 0, 0, pi/2, pi/2, pi/2, pi/2, pi, pi, pi, pi, 3pi/2, 3pi/2, 3pi/2, and 3pi/2.

In operation 303, operation 304, and operation 305 that are described below, processing is performed on the modulation symbols of any antenna port, and the following same processing is performed on the different antenna ports.

Operation 303: The first device performs discrete Fourier transform DFT on the plurality of modulation symbols corresponding to the antenna port. Each symbol obtained after the DFT may be referred to as a sampling symbol, a complex-valued sampling symbol, a complex-valued symbol, or the like.

When the DFT is performed on the modulation symbols, a DFT size may be first determined based on a scheduling bandwidth, and then whether to group the modulation symbols is determined based on the DFT size. In other words, a size of the group is the same as the size used by the DFT, and the DFT size is determined based on the scheduling bandwidth. In a typical case, the DFT size is the same as a number of modulation symbols included in one DFT-s-OFDM symbol of the antenna port. For example, one DFT-s-OFDM symbol of one antenna port corresponds to 600 modulation symbols, and the DFT is performed by using the 600 modulation symbols as a whole. In some embodiments, the modulation symbols may be first divided into a plurality of groups, for example, divided into three groups, each group has 200 modulation symbols, and the DFT is performed by using the 200 modulation symbols as a whole. In the NR protocol, the foregoing DFT process is referred to as transform precoding. In some embodiments, when the pi/2-BPSK modulation is used, the transmit end may perform a frequency domain shaping operation on signals obtained after the DFT.

Operation 303 is optional. If the DFT is not performed, an OFDM signal is finally obtained. If the DFT is performed, a DFT-s-OFDM signal is finally obtained. In some embodiments, precoding may be further performed on symbols obtained after the DFT.

Operation 304: The first device maps the plurality of modulation symbols obtained in operation 302 or the plurality of symbols obtained in operation 303 to a frequency domain resource, where the frequency domain resource is a frequency domain resource corresponding to the antenna port.

In the conventional technology, frequency domain resources corresponding to the different antenna ports are the same. However, in this application, to fully explore a diversity gain, the frequency domain resources corresponding to the different antenna ports do not overlap, or orthogonal frequency domain mapping is performed on the different antenna ports.

A granularity of the frequency domain resource includes but is not limited to a subcarrier (a resource element RE) level (the RE in this application may also be replaced with a subcarrier), a physical resource block PRB level, a precoding resource block group PRG level, and a resource block group RBG level. In addition, the frequency domain resource corresponding to each antenna port may be inconsecutive or may be consecutive. Details are described below.

In an example, the frequency domain resource corresponding to each antenna port is inconsecutive. In some embodiments, an inconsecutive (spaced) part of the frequency domain resource is a frequency domain resource of another antenna port. The inconsecutive (spaced) part is uniform or nonuniform.

The inconsecutive frequency domain resource corresponding to each antenna port corresponds to any frequency domain resource mapping manner in the following examples.

Figure 5A:
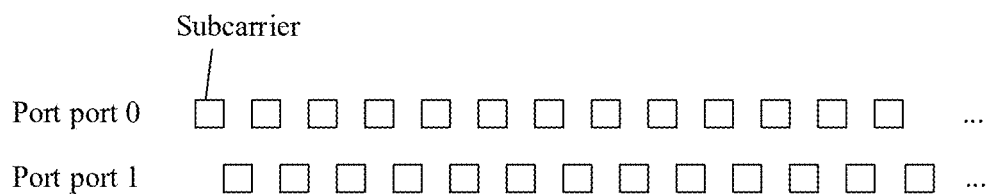
FIG. 5a is a schematic diagram of an RE comb mapping manner according to an embodiment of this application.

Manner 1: When the frequency domain resource includes a plurality of inconsecutive subcarriers (resource elements REs), a mapping manner used by the first device to map the plurality of modulation symbols to the frequency domain resource of the antenna port is: mapping the plurality of modulation symbols to the plurality of inconsecutive REs. A transmission mode corresponding to this mapping manner may be referred to as a multi-port frequency division transmission mode. In some embodiments, when the inconsecutive (spaced) part is uniform, this mapping manner may also be referred to as an RE comb mapping manner. As shown in FIG. 5a, two antenna ports (a port 0 and a port 1) are used as an example to provide a schematic diagram of an RE (subcarrier) comb mapping manner. Symbols corresponding to each antenna port are mapped at even intervals on the frequency domain resource. A comb tooth size is related to the number of antenna ports. When there are two antenna ports, the comb tooth size is 2, in some embodiments, a symbol is placed at an interval of one subcarrier in frequency domain. When there are M antenna ports, the comb size is M, in some embodiments, a symbol is placed at an interval of M−1 subcarriers in frequency domain. This mapping manner is applicable to the OFDM signal and the DFT-s-OFDM signal. This mapping manner has a high order of diversity, and does not damage a single-carrier characteristic of the DFT-s-OFDM.

In the foregoing mapping manner of mapping the plurality of modulation symbols to the plurality of inconsecutive subcarriers, signals on two or more antenna ports are independently transmitted, and occupy a same PRB set (or occupy a same frequency band range). Therefore, channel estimation needs to be separately performed. The different antenna ports require DMRSs of different ports. The DMRS is used for estimating an instant channel, and is used for coherent demodulation of a data channel, a control channel, or a broadcast channel.

Manner 2: When the frequency domain resource includes a plurality of inconsecutive precoding resource block groups PRGs, a mapping manner used by the first device to map the plurality of modulation symbols to the frequency domain resource of the antenna port is: mapping the plurality of modulation symbols to the plurality of inconsecutive PRGs. This mapping manner may also be referred to as a precoding resource block group PRG interleave mapping manner.

Manner 3: When the frequency domain resource includes a plurality of inconsecutive physical resource blocks PRBs, a mapping manner used by the first device to map the plurality of modulation symbols to the frequency domain resource of the antenna port is: mapping the plurality of modulation symbols to the plurality of inconsecutive PRBs. This mapping manner may also be referred to as a physical resource block PRB interleave mapping manner.

Manner 4: When the frequency domain resource includes a plurality of inconsecutive resource block groups RBGs, a mapping manner used by the first device to map the plurality of modulation symbols to the frequency domain resource of the antenna port is: mapping the plurality of modulation symbols to the plurality of inconsecutive RBGs. This mapping manner may also be referred to as a resource block group RBG interleave mapping manner.

Figure 5B:
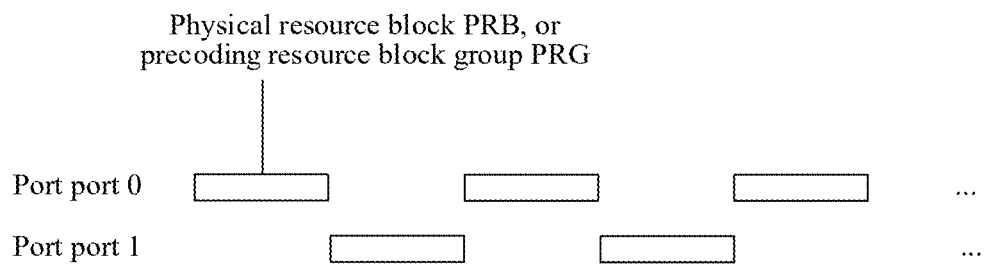
FIG. 5b is a schematic diagram of a precoding resource block group PRG/physical resource block PRB interleave mapping manner according to an embodiment of this application.

As shown in FIG. 5b, two antenna ports (a port 0 and a port 1) are used as an example to provide a schematic diagram of a precoding resource block group PRG/physical resource block PRB interleave mapping manner. Different antenna ports occupy different PRB sets or RB group sets (one RB group includes a plurality of PRGs or PRBs, and a number of included PRGs or PRBs may be configured by a network device). For example, the antenna port 0 occupies even-numbered PRBs, and the antenna port 1 occupies odd-numbered PRBs. This mapping manner is applicable to the OFDM signal, and has a high order of diversity.

In Manner 2, Manner 3, and Manner 4, two or more antenna ports occupy different frequency band ranges, and only one DMRS port may be occupied or allocated.

Figure 5C:
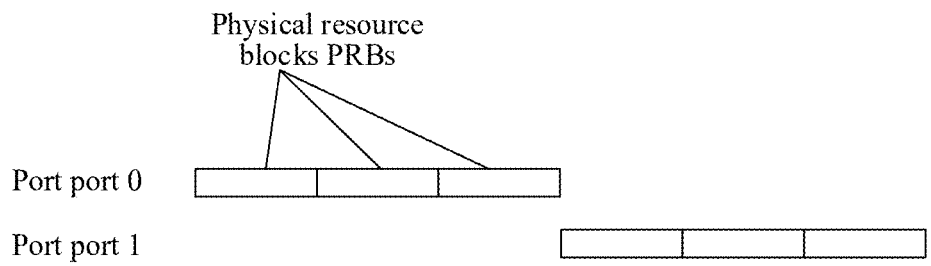
FIG. 5c is a schematic diagram of a sub-band mapping manner according to an embodiment of this application.
Figure 5D:
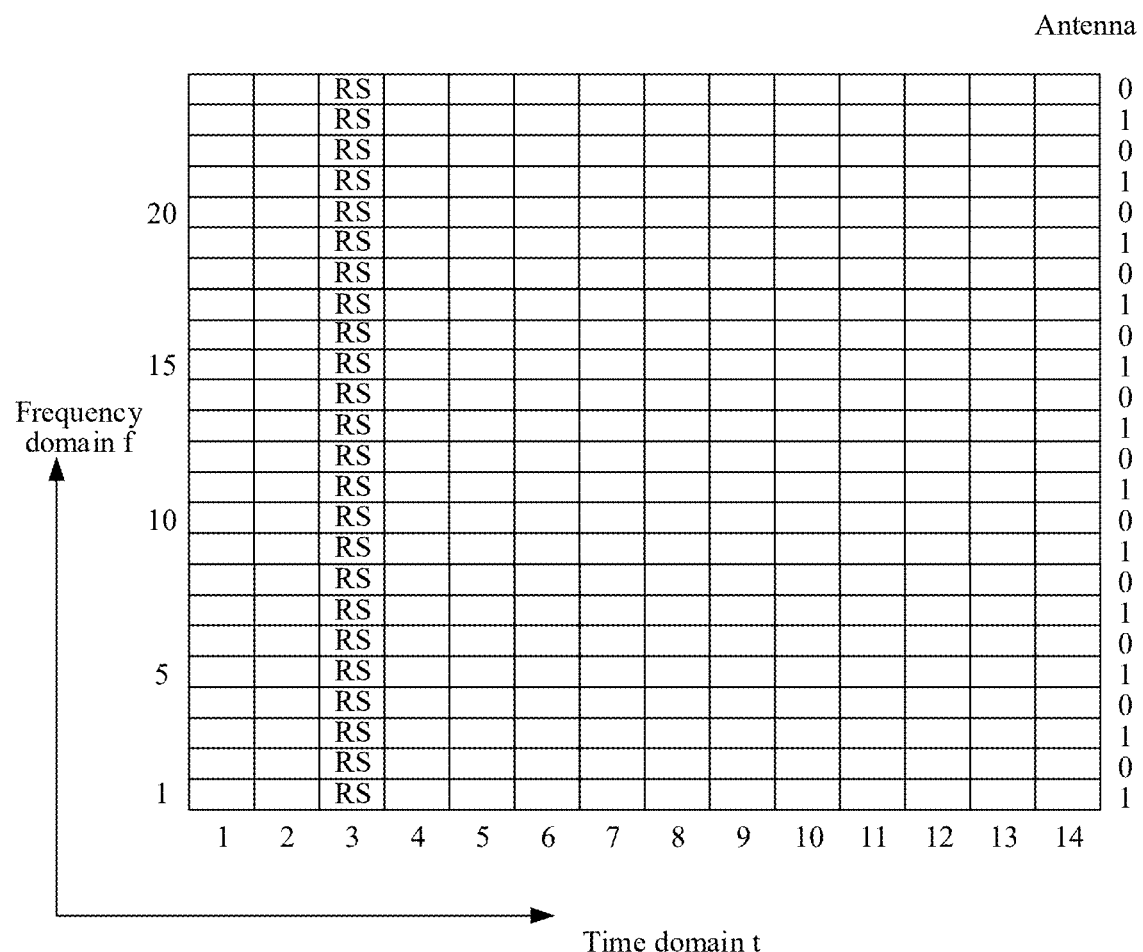
FIG. 5d is a schematic diagram of a time-frequency resource grid after RE comb mapping according to an embodiment of this application.

As shown in FIG. 5d, a schematic diagram of a time-frequency resource grid after RE comb mapping is provided. The horizontal axis represents 14 OFDM symbols (or DFT-s-OFDM symbols) in one slot, and the vertical axis represents two frequency domain PRBs, or 24 frequency domain subcarriers. In FIG. 5d, data signals sent through an antenna 0 occupy even-numbered subcarriers, and data signals sent through an antenna 1 occupy odd-numbered subcarriers.

When the RE comb mapping manner is used for transmitting data signals, during DMRS transmission, subcarriers occupied by DMRSs of antennas may be the same as or different from subcarriers occupied by the data signal. For example, data sent through the antenna 0 and antenna 1 still occupy the even-numbered subcarriers and the odd-numbered subcarriers, respectively. However, DMRSs corresponding to the antenna 0 and the antenna 1 are mapped to the even-numbered subcarriers. In this case, the DMRSs of the two antenna ports can be orthogonal by using a frequency-domain orthogonal code. In an existing NR protocol, a frequency domain resource and an orthogonal code that are occupied by the DMRS are determined based on a DMRS port number.

In another example, Manner 5: when the frequency domain resource corresponding to each antenna port is consecutive, a mapping manner used by the first device to map the plurality of modulation symbols to the frequency domain resource of the antenna port is: mapping the plurality of modulation symbols to the consecutive frequency domain resource. For example, a frequency domain resource of one antenna port includes a plurality of subcarriers or a plurality of PRBs or a plurality of PRGs, and the plurality of subcarriers or the plurality of PRBs or the plurality of PRGs may be considered as one sub-band. In this application, this mapping manner may also be referred to as a sub-band mapping manner. The plurality of frequency domain resources corresponding to the plurality of antenna ports may be consecutive or inconsecutive.

As shown in FIG. 5c, two antenna ports (a port 0 and a port 1) are used as an example to provide a schematic diagram of a sub-band mapping manner. In this mapping manner, a number of sub-bands is equal to a number of antenna ports. Different antenna ports correspond to different sub-bands. Generally, the sub-bands are consecutive in frequency domain, a frequency domain resource (namely, a sub-band) of one antenna port includes three PRBs, and frequency domain resources corresponding to two antenna ports are also consecutive. This mapping manner is applicable to the OFDM signal and the DFT-s-OFDM signal. This mapping manner is easy to implement, and does not damage a single-carrier characteristic of the DFT-s-OFDM.

In Manner 5, two or more antenna ports occupy different frequency band ranges, and only one DMRS port is required. However, a plurality of sub-bands are transmitted through the different antenna ports. Therefore, DMRS sequences need to be separately mapped to the plurality of sub-bands, in some embodiments, one DMRS sequence is sent on one sub-band rather than on the plurality of sub-bands (in other words, a part of one DMRS sequence is transmitted on one sub-band, and another part of the DMRS sequence is transmitted on another sub-band), to ensure that a PAPR of a DMRS is not deteriorated. In some embodiments, when an OFDM waveform is used, the DMRS sequences of the plurality of sub-bands are determined based on information such as respective frequency domain positions and port numbers. In another possible implementation, when a DFT-s-OFDM waveform is used, the DMRS sequences of the plurality of sub-bands are the same.

Figure 5E:
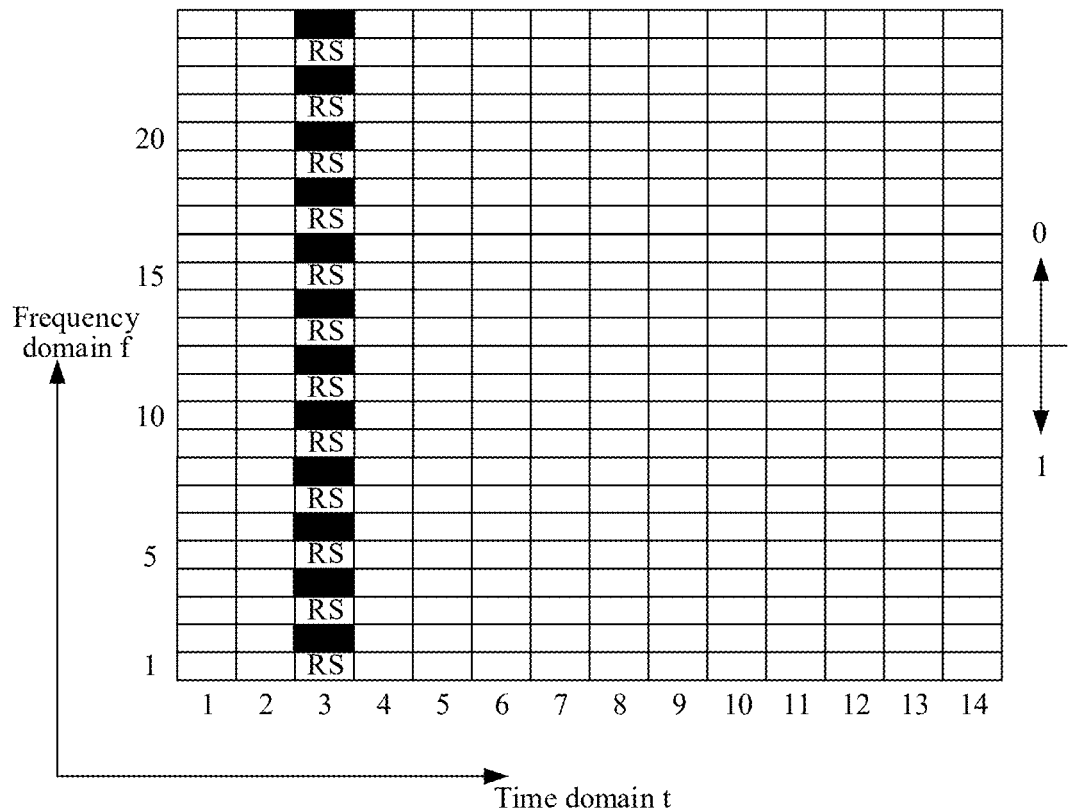
FIG. 5e is a schematic diagram of a time-frequency resource grid after sub-band mapping according to an embodiment of this application.

As shown in FIG. 5e, a schematic diagram of a time-frequency resource grid after sub-band mapping is provided. The horizontal axis represents 14 OFDM symbols (or DFT-s-OFDM symbols) in one slot, and the vertical axis represents two frequency domain PRBs, or 24 frequency domain subcarriers. In FIG. 5e, a data signal sent through the antenna 0 occupies one PRB (namely, 12 subcarriers and 14 symbols), and a data signal sent through the antenna 1 occupies the other PRB. The antenna 0 occupies a same sub-band to send the data signal and send a DMRS, and the antenna 1 also occupies a same sub-band to send the data signal and send a DMRS.

How the first device determines a mapping manner used for mapping the symbol to the frequency domain resource is described subsequently.

Operation 305: The first device processes a frequency domain signal obtained after the frequency domain resource mapping, to generate the DFT-s-OFDM signal or the OFDM signal, for example, performs operations such as inverse fast Fourier transform (IFFT) and cyclic prefix (CP) addition, to obtain the DFT-s-OFDM signal or the OFDM signal. Then, the DFT-s-OFDM signal or the OFDM signal may be sent through a corresponding antenna port.

In this embodiment, one transport block is transmitted through the different antenna ports. In other words, the transport block is transmitted on the different channels, and therefore diversity communication of the transport block is implemented. In addition, a transmit antenna port diversity gain can be obtained in both the OFDM waveform and the DFT-s-OFDM waveform, and the provided solutions are slightly affected by factors such as a channel condition and a bandwidth size. A stable diversity gain can be provided in various application scenarios.

In another embodiment of this application, the antenna port in the example in FIG. 3 may be replaced with an antenna port set. In other words, the plurality of symbols are mapped to a plurality of antenna port sets, and the antenna port sets are a whole. In this application, a number of antenna ports in one antenna port set is not concerned, and only a number of antenna port sets is concerned. This replacement manner is also applicable to several embodiments described subsequently.

In the foregoing operation 304, five mapping manners are described. The following describes how the first device determines a mapping manner used for mapping the symbol (for example, the modulation symbol or the symbol obtained after the DFT) to the frequency domain resource.

Manner a: The protocol specifies a mapping manner of mapping the symbol to the frequency domain resource when the diversity communication manner in this application is used. The mapping manner specified in the protocol may be any one of the foregoing five mapping manners, or may be a mapping manner in addition to the five mapping manners, for example, common single-stream transmission.

Manner b: The first device may further receive a first indication, where the first indication indicates the mapping manner of mapping the plurality of symbols to the frequency domain resource. For example, when more than four mapping manners are included, the second device may use three bits to explicitly indicate the mapping manners. For example, 000, 001, 010, 011, and 100 respectively represent different mapping manners.

Generally, the first device is a terminal, and the terminal receives the first indication from a network device. The first indication may be carried in semi-static signaling or dynamic signaling. The semi-static signaling, for example, is radio resource control (RRC) signaling and a media access control (MAC) control element (CE). The dynamic signaling, for example, is downlink control information (DCI).

In some embodiments, when the first indication is carried in the dynamic signaling, for example, indicated by uplink scheduling DCI, the first indication indicates only a mapping manner used in current scheduling transmission. The first device may determine a new mapping manner based on a new indication in next transmission, next-next transmission, . . . , and the like.

In some embodiments, when the first indication is carried in the semi-static signaling, the mapping manner indicated by the first indication may be always used. The first device may use the mapping manner used in the current transmission in next transmission, next-next transmission, . . . , until the first device receives anew indication carried in semi-static signaling, to indicate a new mapping manner.

Manner c: The first device may determine, by receiving one or more demodulation reference signal DMRS port identifiers, a mapping manner to be used.

Generally, the first device is a terminal, and the terminal receives one or more DMRS port identifiers from the network device.

In an example, a number of DMRS port identifiers is sent to the first device, to implicitly indicate which mapping manner is used by the first device to map the symbol to the frequency domain resource. Details are as follows:

When the first device receives a plurality of DMRS port identifiers, a mapping manner used by the first device to map the plurality of symbols to the frequency domain resource of the antenna port is: the frequency domain resource includes a plurality of resource elements REs, and the plurality of resource elements REs are inconsecutive, namely, Manner 1. When the first device receives one DMRS port identifier, a mapping manner used by the first device to map the plurality of symbols to the frequency domain resource of the antenna port is: the frequency domain resource corresponding to each antenna port is consecutive, namely, Manner 5; or the frequency domain resource includes a plurality of precoding resource block groups PRGs, and the plurality of precoding resource block groups PRGs are inconsecutive, namely, Manner 2; or the frequency domain resource includes a plurality of physical resource blocks PRBs, and the plurality of physical resource blocks PRBs are inconsecutive, namely, Manner 3; or the frequency domain resource includes a plurality of resource block groups RBGs, and the plurality of resource block groups RBGs are inconsecutive, namely, Manner 4; or the common single-stream transmission.

In another example, the DMRS port identifier is sent to the first device, to implicitly indicate the first device to map the symbol to the frequency domain resource in the mapping manner in Manner 1. Details are as follows:

Even if the first device receives only one DMRS port identifier, the first device may derive an identifier of another port according to a rule. In this case, the mapping manner in Manner 1 may still be used. The rule herein may be specified in a protocol, or may be configured by the network device for the first device.

The DMRS port identifier may be a DMRS port number. When the other one or more DMRS port numbers are derived based on one DMRS port number a, a value may be added to or subtracted from the DMRS port number, to obtain the other DMRS port numbers.

The following describes a derivation manner for the DMRS port number by using only two antenna ports, namely, two DMRS ports as an example. This example does not constitute a limitation on this application.

In an example, if a DMRS configuration type 1 is configured for the terminal, second DMRS port number=first DMRS port number+1; or second DMRS port number=first DMRS port number+2.

In another example, if a DMRS configuration type 2 is configured for the terminal, second DMRS port number=first DMRS port number+1;

second DMRS port number=first DMRS port number+2; or second DMRS port number=first DMRS port number+3.

The DMRS configuration type 1 and the DMRS configuration type 2 are two types specified in the protocol.

Alternatively, second DMRS port number=first DMRS port number−1, second DMRS port number=first DMRS port number−2, or the like.

In addition, it should be noted that, configuring one or more demodulation reference signal DMRS port identifiers for the first device may be decoupled from determining the mapping manner. The one or more demodulation reference signal DMRS port identifiers are configured for the first device to help the first device send a DMRS. For example, the mapping manner may be determined in Manner a or Manner b, or the mapping manner may be determined in Manner d described below. If the mapping manner used by the first device is Manner 1, and if the first device receives a plurality of DMRS port identifiers from the network device, each DMRS port identifier corresponds to one antenna port; or if the first device receives one DMRS port identifier from the network device, the first device may also derive an identifier of another port in the foregoing manner.

Manner d: The first device may determine, by receiving information about one or more sub-bands, to use the mapping manner in Manner 5. The information about the sub-band determines the frequency domain resource corresponding to the antenna port, and the information about the sub-band indicates a frequency domain position of the sub-band, or indicate a bandwidth of the sub-band. In other words, the information about the sub-band is sent to the first device, to implicitly indicate the first device to map the symbol to the frequency domain resource in the mapping manner in Manner 5.

Generally, the first device is a terminal, and the terminal receives the information about one or more sub-bands from the network device.

Figure 5F:
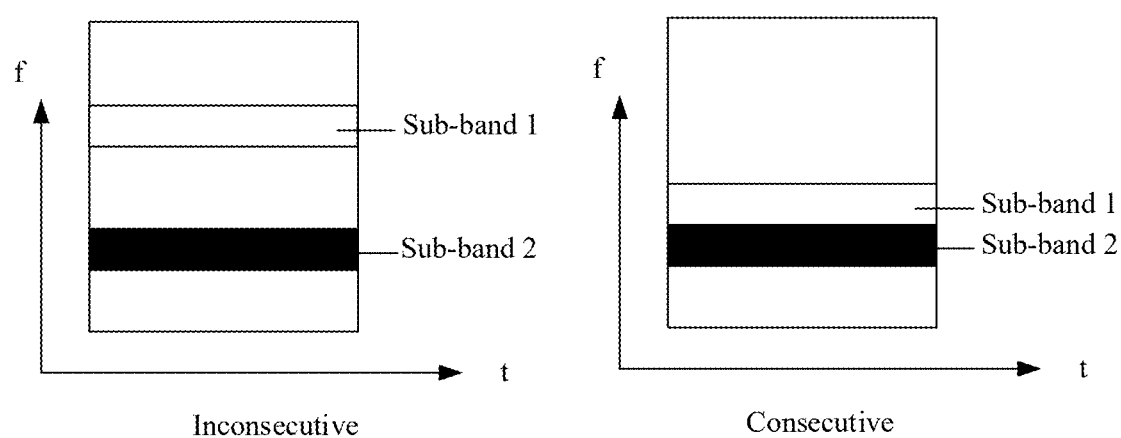
FIG. 5f is a schematic diagram of consecutive or inconsecutive frequency-domain ranges of two sub-bands according to an embodiment of this application.

Generally, granularities (bandwidths) of all sub-bands are the same. For example, all the sub-bands occupy a same number of subcarriers, a same number of RBs, a same number of PRBs, or a same number of PRGs. Frequency domain ranges of the plurality of sub-bands may be consecutive or inconsecutive. For example, as shown in FIG. 5f, an example in which frequency domain ranges of two sub-bands may be consecutive and an example in which frequency domain ranges of two sub-bands are inconsecutive are provided. The two sub-bands may be located in a same bandwidth part (BWP) or a same component carrier (CC), or may occupy different CCs. Generally, the component carrier includes a plurality of subcarriers.

When the network device notifies the terminal (the first device) of the information about the one or more sub-bands, examples include, but are not limited to the following examples:

For example, the network device sends the information about the plurality of sub-bands, for example, the frequency domain position, to the first device. In this case, each sub-band corresponds to one antenna port.

For example, the network device sends the information about the sub-band, for example, the frequency domain position and the bandwidth, to the first device, the first device may derive one or more other sub-bands based on the sub-band. This derivation manner may be specified in a protocol, or may be agreed by both parties of data transmission. For example, the terminal places another sub-band at a place adjacent to the sub-band.

For example, the network device notifies the first device of a sum of bandwidths of all the sub-bands (for example, 32 RBs or 64 RBs), and the first device may determine the bandwidth of each sub-band and the frequency domain position of each sub-band based on the number of antenna ports.

For example, the network device notifies the first device of the bandwidth of each sub-band, and the first device determines the frequency domain position of each sub-band. In some embodiments, the network device needs to notify only one bandwidth, and the bandwidths of all the sub-bands are the same.

The network device may notify the terminal of the information about the one or more sub-bands by using downlink control information DCI.

Currently, the DCI includes frequency domain resource configuration information. In this application, the frequency domain resource configuration information in the DCI may indicate the frequency domain position occupied by one sub-band. In some embodiments, in this application, based on that the DCI includes the frequency domain resource configuration information, second indication information is further added, to indicate frequency domain information of one or more other sub-bands. In some embodiments, the second indication information directly indicates a start position of frequency domain positions of one or more other sub-bands. A notification granularity of the start position may be an RB, or may be a plurality of RBs, for example, an RBG. If the network device indicates the frequency domain information of one or more other sub-bands by using the DCI, a new bit needs to be added to the DCI or original bits need to be re-interpreted in the DCI. In other words, the second indication information may be carried by the newly added bit or the re-interpreted original bits.

In some embodiments, when the network device configures the diversity transmission mode in this application for the UE by using signaling such as RRC, the UE considers that the DCI includes the foregoing newly added bit or the UE re-interprets some bits in the DCI. The newly added bit may be in a DCI format 0_1 or a DCI format 0_2, or may be in another DCI format.

In non-coherent transmission, the network device may learn of channel amplitude information of each antenna port, but it is difficult to obtain accurate channel phase information. Non-consecutive sub-band mapping can ensure that the terminal obtains a frequency selective gain of each antenna through uplink transmission.

In addition, it should be noted that, configuring the information about the one or more sub-bands for the first device may be decoupled from determining the mapping manner. The information about the one or more sub-bands are configured for the first device to help the first device determine a mapping position. For example, it may be determined, in Manner a or Manner b, that the mapping manner is Manner 5. Then, a mapping position is determined based on the information about the sub-band in Manner 5. If the first device receives the information about the plurality of sub-bands from the network device, each sub-band corresponds to one antenna port. If the first device receives the information about the sub-band from the network device, the first device may also derive a frequency domain position of another sub-band.

As described above, based on that the DCI includes the frequency domain resource configuration information, second indication information is further added, to indicate frequency domain positions of one or more other sub-bands. In another embodiment, the second indication information may also indicate that frequency band centers of the sub-bands overlap, or the frequency band centers of the sub-bands do not overlap. The second indication information may occupy 1 bit. In an example in which there are two sub-bands, which are respectively a first sub-band and a second sub-band, the frequency domain configuration information indicates a frequency domain position occupied by the first sub-band, and the second indication information may indicate that a frequency domain center of the second sub-band and a frequency domain center of the first sub-band overlap or do not overlap. When the frequency domain centers do not overlap, it may be considered that the mapping manner in Manner 5 of this application is used for performing frequency domain resource mapping. When the frequency domain centers overlap, the first sub-band and the second sub-band have a same frequency domain resource. In other words, the first sub-band and the second sub-band have a same frequency domain position. It may be considered that a manner in the conventional technology is used for performing resource mapping.

In an optional implementation, when the first sub-band and the second sub-band have the same frequency domain position, the diversity transmission is converted into multi-stream transmission. A single stream transmission means that data sent through a plurality of ports is the same, and a multi-stream means that data sent through a plurality of ports is different. For example, the comb transmission and the transmission of a plurality of sub-bands in this application are multi-stream transmission.

Figure 6:
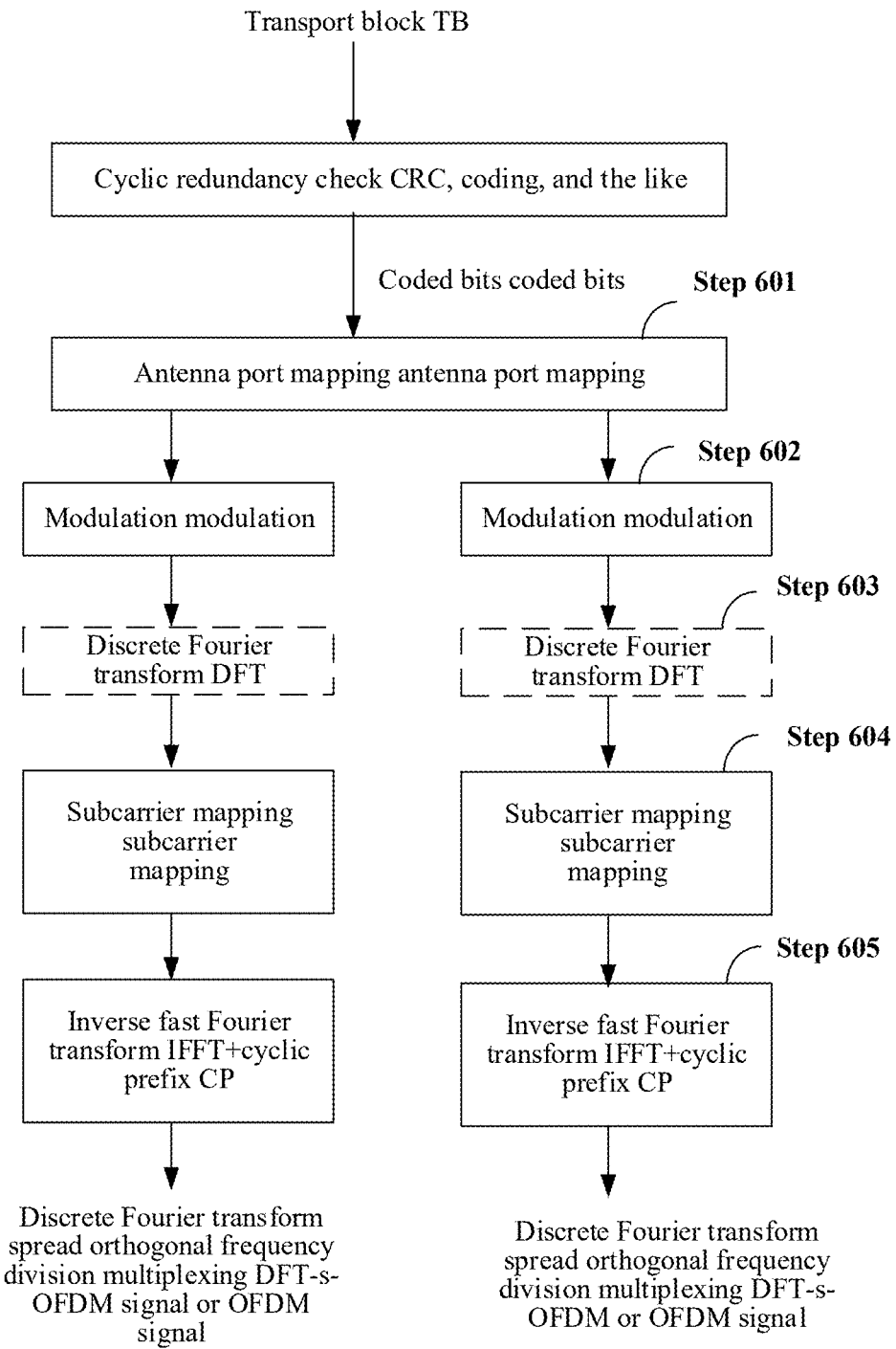
FIG. 6 is a schematic diagram of a diversity communication process according to an embodiment of this application.

As shown in FIG. 6, a schematic diagram of a diversity communication process is further described below. A difference between an example in FIG. 6 and the example in FIG. 3 lies in that in the example in FIG. 3, the coded bits are first modulated (operation 301), and then the modulated modulation symbols are mapped to the plurality of antenna ports (operation 302). In the example in FIG. 6, the coded bits are first mapped to the plurality of antenna ports, and then the bits on each antenna port are modulated. Other parts are the same.

FIG. 6 includes the following operations.

Operation 601: A first device maps a plurality of bits to a plurality of antenna ports, where the plurality of bits are coded bits of one transport block. A process of operation 601 is the same as a process of mapping the modulation symbols to the plurality of antenna ports in operation 302 in FIG. 3, and a difference lies only in that the modulation symbols in operation 302 are replaced with the coded bits.

The first device performs the following same processing on the bits on each antenna port. For example, there are two antenna ports, and operation 602 to operation 605 are performed on one of the antenna ports, and operation 602 to operation 605 are also performed on the other antenna port.

Operation 602: The first device modulates the bits corresponding to the antenna port to obtain a plurality of modulation symbols. A process of operation 602 is the same as a process of operation 301 in FIG. 3, and details are not repeatedly described.

Operation 603: The first device performs discrete Fourier transform DFT on the plurality of modulation symbols corresponding to the antenna port. Operation 603 is optional. A process of operation 603 is the same as a process of operation 303 in FIG. 3, and details are not repeatedly described. In some embodiments, precoding may be further performed on symbols obtained after the DFT.

Operation 604: The first device maps the plurality of modulation symbols obtained in operation 602 or the plurality of symbols obtained in operation 603 to a frequency domain resource, where the frequency domain resource is a frequency domain resource corresponding to the antenna port, and frequency domain resources corresponding to different antenna ports do not overlap. A process of operation 604 is the same as a process of operation 304 in FIG. 3, and details are not repeatedly described.

Operation 605: The first device processes a frequency domain signal obtained after the frequency domain resource mapping, for example, performs operations such as inverse fast Fourier transform IFFT and cyclic prefix CP addition, to obtain a DFT-s-OFDM signal or an OFDM signal. Then, the DFT-s-OFDM signal or the OFDM signal may be sent through a corresponding antenna port. A process of operation 605 is the same as a process of operation 305 in FIG. 3, and details are not repeatedly described.

Figure 7:
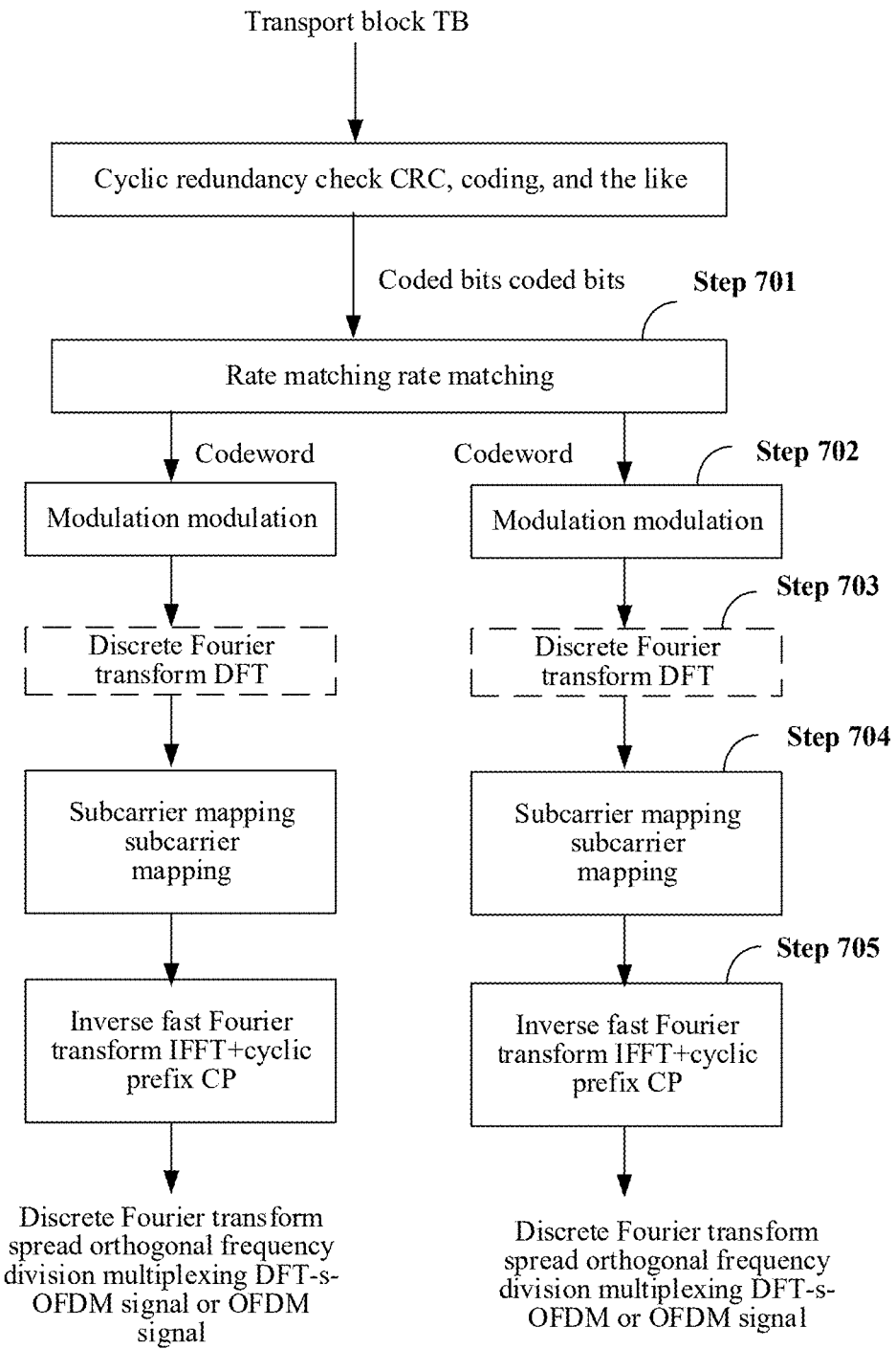
FIG. 7 is a schematic diagram of a diversity communication process according to an embodiment of this application.

As shown in FIG. 7, a schematic diagram of a diversity communication process is further described below. The process includes the following operations.

Operation 701: A first device processes one transport block to generate a plurality of codewords.

The processing herein may be performing processing such as cyclic redundancy check (CRC), coding, and rate matching to generate the plurality of codewords. Different codewords correspond to different antenna ports, and frequency domain resources corresponding to the different antenna ports do not overlap.

In an example, one codeword is a redundancy version of the transport block. Redundancy versions of different codewords are the same or different. For example, a first antenna port uses a redundancy version 0 of one TB, and a second antenna port uses a redundancy version 1, 2, or 3 of the same TB. A combined receive gain of the different redundancy versions is greater than a combined receive gain of the same version.

The different antenna ports transmit different redundancy versions of one codeword, and each redundancy version can be independently decoded at a receive end. In this way, it is ensured that the receive end can still implement correct decoding when a power of one or a group of transmit ports is excessively low.

In an example, a redundancy version corresponding to each antenna port may be specified in a protocol, or may be notified by the network device to the first device, for example, by using DCI. For example, the DCI may include redundancy version information of each antenna port; or the DCI includes redundancy version information of only one antenna port, and redundancy version information of other antenna ports may be derived from the redundancy version information of the antenna port.

In operation 702, operation 703, operation 704, and operation 705 that are described below, processing is performed on any antenna port (namely, any codeword), and the following same processing is performed on the different antenna ports (codewords).

Operation 702: The first device modulates bits in the codeword to obtain a plurality of modulation symbols.

One codeword includes a plurality of bits. The scheme of modulating the bits in operation 702 is the same as the scheme of modulating the bits in operation 301 in FIG. 3, and details are not repeatedly described.

In some embodiments, operation 703: The first device performs discrete Fourier transform DFT on the plurality of modulation symbols corresponding to the antenna port. A process of operation 703 is the same as a process of operation 303 in FIG. 3, and details are not repeatedly described. In some embodiments, precoding may be further performed on symbols obtained after the DFT.

Operation 704: The first device maps the plurality of modulation symbols obtained in operation 702 or the plurality of symbols obtained in operation 703 to a frequency domain resource, where the frequency domain resource is a frequency domain resource corresponding to the antenna port. A process of operation 704 is the same as a process of operation 304 in FIG. 3, and details are not repeatedly described.

Operation 705: The first device processes a frequency domain signal obtained after the frequency domain resource mapping, for example, performs operations such as inverse fast Fourier transform IFFT and cyclic prefix CP addition, to obtain a DFT-s-OFDM signal or an OFDM signal. Then, the DFT-s-OFDM signal or the OFDM signal may be sent through a corresponding antenna port. A process of operation 705 is the same as a process of operation 305 in FIG. 3, and details are not repeatedly described.

In this embodiment, operations such as independent modulation, DFT, frequency domain mapping, and IFFT are performed on a plurality of redundancy versions of one TB on different antenna ports to generate a DFT-s-OFDM symbol or an OFDM symbol. Therefore, it may be considered that the TB generates two PUSCHs, and the two PUSCHs are sent at different frequency domain positions of the different antenna ports.

In this embodiment, different codewords generated by one transport block are transmitted through different antenna ports. Different codewords pass through different channels. In other words, the transport block is transmitted on the different channels, and therefore diversity communication of the transport block is implemented. In addition, each codeword may be separately decoded. Therefore, even if one antenna of a receive end experiences severe fading (for example, is blocked), the receive end may further restore the transport block of a transmit end by using data received through another antenna.

In an embodiment of this application, the diversity communication solution shown in FIG. 7 may be combined with an existing slot aggregation method. In an existing uplink slot aggregation transmission method, a base station schedules UE to perform a plurality of times of physical uplink shared channel PUSCH transmission, and different redundancy versions of one TB are used for the plurality of times of PUSCH transmission. A manner of determining the redundancy version is shown in Table 5. For example, the base station schedules the UE to perform uplink transmission of slot aggregation, and a number of repetitions is 2. After receiving scheduling information, the UE performs transmission in two slots, and redundancy versions used for the two times of transmission are indicated by DCI and/or are determined based on the following Table 5.

A similar mechanism may be used in the solution in this embodiment. A difference lies in that a same symbol set in a same slot is used for two (or more) times of PUSCH transmission, but different redundancy versions and frequency domain resources are used for the two times of transmission. A slot aggregation solution in an existing protocol may be directly reused for determining the redundancy version, and for determining the frequency domain resource, refer to the description in the foregoing embodiment.

TABLE 5

| Redundancy version for PUSCH transmission | | | | |
|---|---|---|---|---|
| Redundancy version identifier indicated by the DCI scheduling the PUSCH ($rv_{id}$ indicated by the DCI scheduling the PUSCH) | $rv_{id}$ to be applied to an $n^{th}$ transmission occasion (repetition Type A) or an $N^{th}$ actual repetition (repetition Type B) $rv_{id}$ to be applied to nth transmission occasion (repetition Type A) or $n^{th}$ actual repetition (repetition Type B) | | | |
| | A remainder of n divided by 4 is 0. In other words, n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Figure 8:
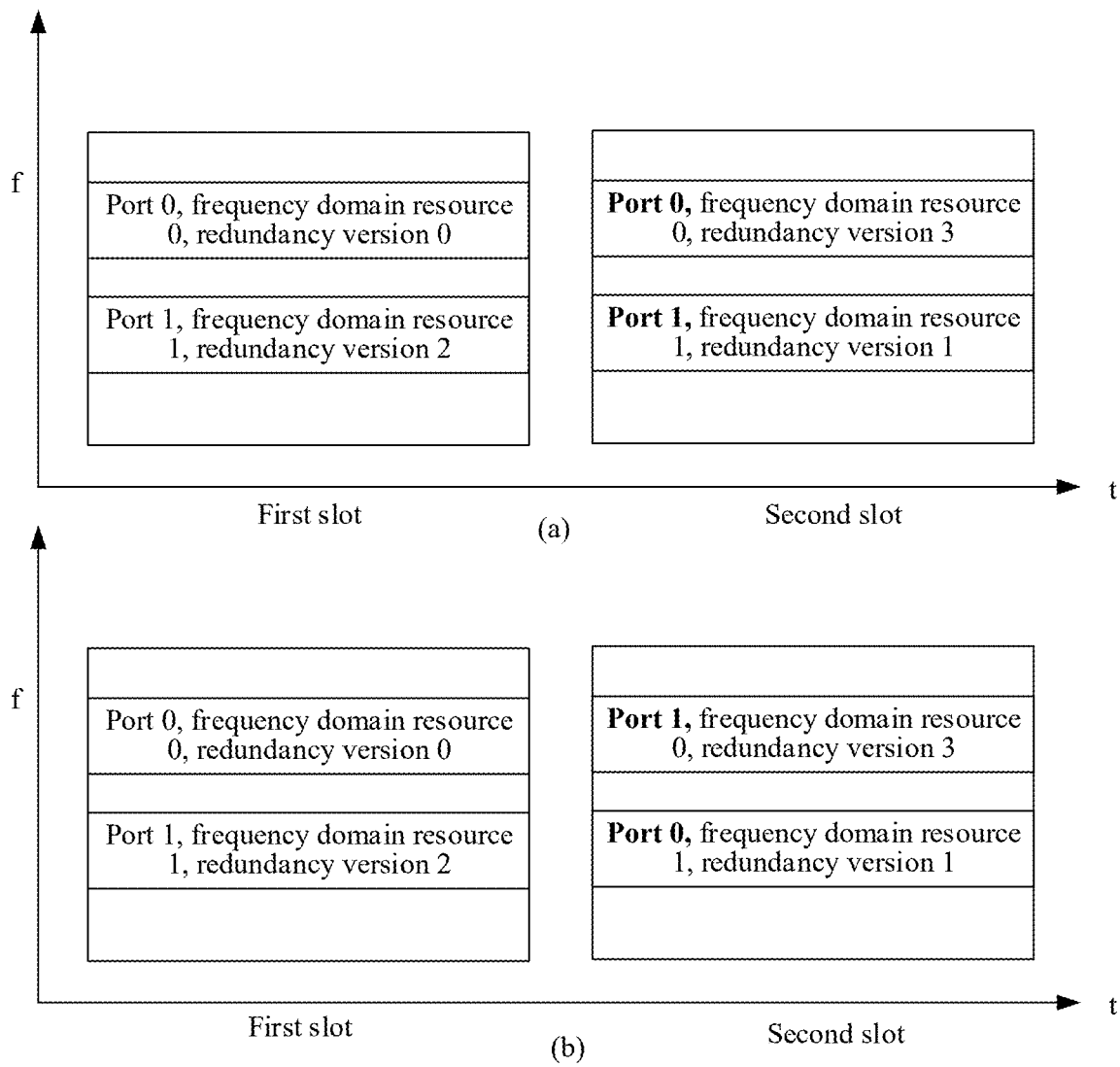
FIG. 8 is a schematic diagram of a mapping relationship between a frequency domain port and a time domain resource according to an embodiment of this application.

In some embodiments, the base station configures the special repetition manner shown in this embodiment for the UE, and then the UE performs repeated sending in frequency domain and time domain. If a number of repeated sending times indicated by the base station is equal to a number of antenna ports or antenna port groups on which transmit end diversity is performed, the repeated sending is completed in one slot. If the number of repeated sending times indicated by the base station is greater than the number of antenna ports or antenna port groups on which the transmit end diversity is performed, the repeated sending is completed in a plurality of slots. In some embodiments, the UE preferentially performs repeated sending in frequency domain or on the antenna ports, and then performs repeated sending in time domain. When there is a time domain repetition, a mapping relationship between the antenna port and the frequency domain resource may be changed in different slots. As shown in FIG. 8, in (a) and (b), for a repeated first slot, a mapping relationship between a frequency domain port and a time domain resource does not change, and for a repeated second slot, the mapping relationship between the frequency domain port and the time domain resource changes.

The foregoing describes a plurality of diversity communication processes performed by the first device (the transmit end). The following describes a diversity communication process performed by the second device (the receive end). A process performed by the receive end is an inverse process of the process performed by the transmit end. Details are as follows:

The second device processes a received OFDM signal to obtain a frequency domain signal;

the second device demaps the frequency domain signal to obtain a modulation symbol;

the second device processes the modulation symbol to obtain soft information of a plurality of codewords; and the second device combines the soft information of the plurality of codewords to obtain a transport block.

The foregoing describes the methods in embodiments of this application, and the following describes apparatuses in embodiments of this application. The method and the apparatus are based on a same technical concept. The method and the apparatus have similar principles for resolving problems. Therefore, mutual reference may be made between implementations of the apparatus and the method, and details are not repeatedly described.

In embodiments of this application, the apparatus may be divided into function modules based on the foregoing method examples. For example, the apparatus may be divided into function modules based on corresponding functions, or two or more functions may be integrated into one module. These modules may be implemented in a form of hardware, or may be implemented in a form of a software function module. It should be noted that, in embodiments of this application, module division is an example, and is merely logical function division. In some embodiments, another division manner may be used.

Figure 9:
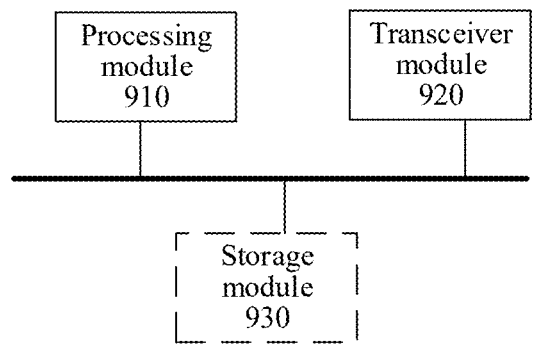
FIG. 9 is a structural diagram of a diversity communication apparatus according to an embodiment of this application.

Based on a same technical concept as the foregoing method, FIG. 9 is a schematic diagram of a structure of a diversity communication apparatus 900. The apparatus 900 may be a first device, or may be a chip or a function unit used in a first device. The apparatus 900 has any function of the first device in the foregoing methods. For example, the apparatus 900 can perform the operations performed by the first device in the methods in FIG. 2, FIG. 3, FIG. 6, and FIG. 7.

The apparatus 900 may include a transceiver module 920 and a processing module 910, and in some embodiments, further include a storage module 930. The processing module 910 may be separately connected to the storage module 930 and the transceiver module 920, and the storage module 930 may also be connected to the transceiver module 920.

The transceiver module 920 may perform a receiving action and a sending action performed by the first device in the foregoing method embodiments.

The processing module 910 may perform actions other than the sending action and the receiving action in the actions performed by the first device in the foregoing method embodiments.

In an example, the processing module 910 is configured to: map a plurality of modulation symbols to a plurality of antenna ports, where a plurality of consecutive modulation symbols are mapped to one antenna port in each mapping, and the plurality of modulation symbols are generated based on one transport block; and perform the following processing on the modulation symbols on each antenna port: mapping the plurality of modulation symbols to a frequency domain resource, where the frequency domain resource is a frequency domain resource corresponding to the antenna port, and frequency domain resources corresponding to different antenna ports do not overlap.

In an example, the processing module 910 is configured to: process one transport block to generate a plurality of codewords, and perform the following processing on each codeword: modulating bits in the codeword to obtain a plurality of modulation symbols, and mapping the plurality of modulation symbols to a frequency domain resource, where the frequency domain resource is a frequency domain resource corresponding to an antenna port, where different codewords correspond to different antenna ports, and frequency domain resources corresponding to the different antenna ports do not overlap.

In an example, the transceiver module 920 is further configured to receive a first indication, where the first indication indicates a mapping manner of mapping the plurality of modulation symbols to the frequency domain resource.

In an example, the transceiver module 920 is further configured to receive one or more demodulation reference signal DMRS port identifiers.

In an example, the transceiver module 920 is further configured to receive information about one or more sub-bands, where the information about the sub-band is used for determining the frequency domain resource corresponding to the antenna port.

In an example, the transceiver module 920 is configured to send a signal, in some embodiments, send the modulation symbols mapped to the frequency domain resource corresponding to each antenna port. When the apparatus is a baseband apparatus, the transceiver module 920 may be an external communication interface of the baseband apparatus. When the apparatus is not a baseband apparatus, the transceiver module 920 may be an antenna or an antenna port.

In an example, the storage module 930 may store computer-executable instructions of the method performed by the first device, so that the processing module 910 and the transceiver module 920 perform the method performed by the first device in the foregoing example.

The transceiver module 920 may also be divided into a receiving module and a sending module. The sending module performs a sending action, and the receiving module performs a receiving action.

For example, the storage module may include one or more memories. The memory may be a component configured to store a program or data in one or more devices or circuits. The storage module may be a register, a cache, a RAM, or the like. The storage module may be integrated with the processing module. The storage module may be a ROM or another type of static storage device that can store static information and instructions. The storage module may be independent of the processing module.

The transceiver module may be an input/output interface, a pin, a circuit, or the like.

The foregoing describes the apparatus used in the first device in embodiments of this application. The following describes a possible product form of the apparatus used in the first device. It should be understood that any form of product that has the feature of the apparatus used in the first device described in FIG. 9 falls within the protection scope of this application. It should be further understood that the following description is merely an example, and a product form of the apparatus used in the first device in embodiments of this application should not be limited thereto.

As a possible product form, the apparatus may be implemented by using a general bus architecture.

Figure 10:
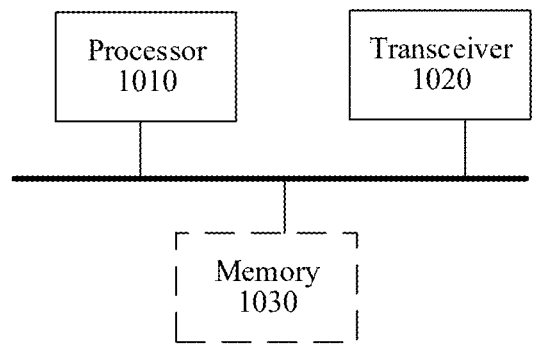
FIG. 10 is a structural diagram of a diversity communication apparatus according to an embodiment of this application.

As shown in FIG. 10, a schematic block diagram of a diversity communication apparatus 1000 is provided. The apparatus 1000 may be a first device, or may be a chip used in the first device. It should be understood that the apparatus has any function of the first device in the foregoing method. For example, the apparatus 1000 can perform the operations performed by the first device in the methods in FIG. 2, FIG. 3, FIG. 6, and FIG. 7.

The apparatus 1000 may include a processor 1010, and in some embodiments, further include a transceiver 1020 and a memory 1030. The transceiver 1020 may be configured to receive program instructions and transmit the program instructions to the processor 1010, or the transceiver 1020 may be configured to perform communication interaction between the apparatus 1000 and another communication device, for example, exchange control signaling and/or service data. The transceiver 1020 may be a code and/or data read/write transceiver, or the transceiver 1020 may be a signal transmission transceiver between a processor and a transceiver. The processor 1010 and the memory 1030 are electrically coupled.

For example, the memory 1030 is configured to store a computer program. The processor 1010 may be configured to invoke the computer program or instructions stored in the memory 1030, to perform the method performed by the first device in the foregoing example, or perform, by using the transceiver 1020, the method performed by the first device in the foregoing example.

The processing module 910 in FIG. 9 may be implemented by using the processor 1010.

The transceiver module 920 in FIG. 9 may be implemented by using the transceiver 1020. Alternatively, the transceiver 1020 is divided into a receiver and a transmitter. The receiver performs a function of the receiving module, and the transmitter performs a function of the sending module.

The storage module 930 in FIG. 9 may be implemented by using the memory 1030.

As a possible product form, the apparatus may be implemented by using a general-purpose processor (the general-purpose processor may also be referred to as a chip or a chip system).

In some embodiments, the general-purpose processor that implements the apparatus used in the first device includes a processing circuit (the processing circuit may also be referred to as a processor) and an input/output interface that is internally connected to and communicates with the processing circuit. In some embodiments, a storage medium (the storage medium may also be referred to as a memory) is further included. The storage medium is configured to store instructions to be executed by the processing circuit, to perform the method performed by the first device in the foregoing example.

The processing module 910 in FIG. 9 may be implemented by using the processing circuit.

The transceiver module 920 in FIG. 9 may be implemented by using the input/output interface. Alternatively, the input/output interface is divided into an input interface and an output interface. The input interface performs a function of the receiving module, and the output interface performs a function of the sending module.

The storage module 930 in FIG. 9 may be implemented by using the storage medium.

As a possible product form, the apparatus in embodiments of this application may further be implemented by using the following components: one or more FPGAs (field programmable gate arrays), a PLD (programmable logic device), a controller, a state machine, gate logic, a discrete hardware component, any other suitable circuit, or any combination of circuits that can perform various functions described in this application.

Figure 11:
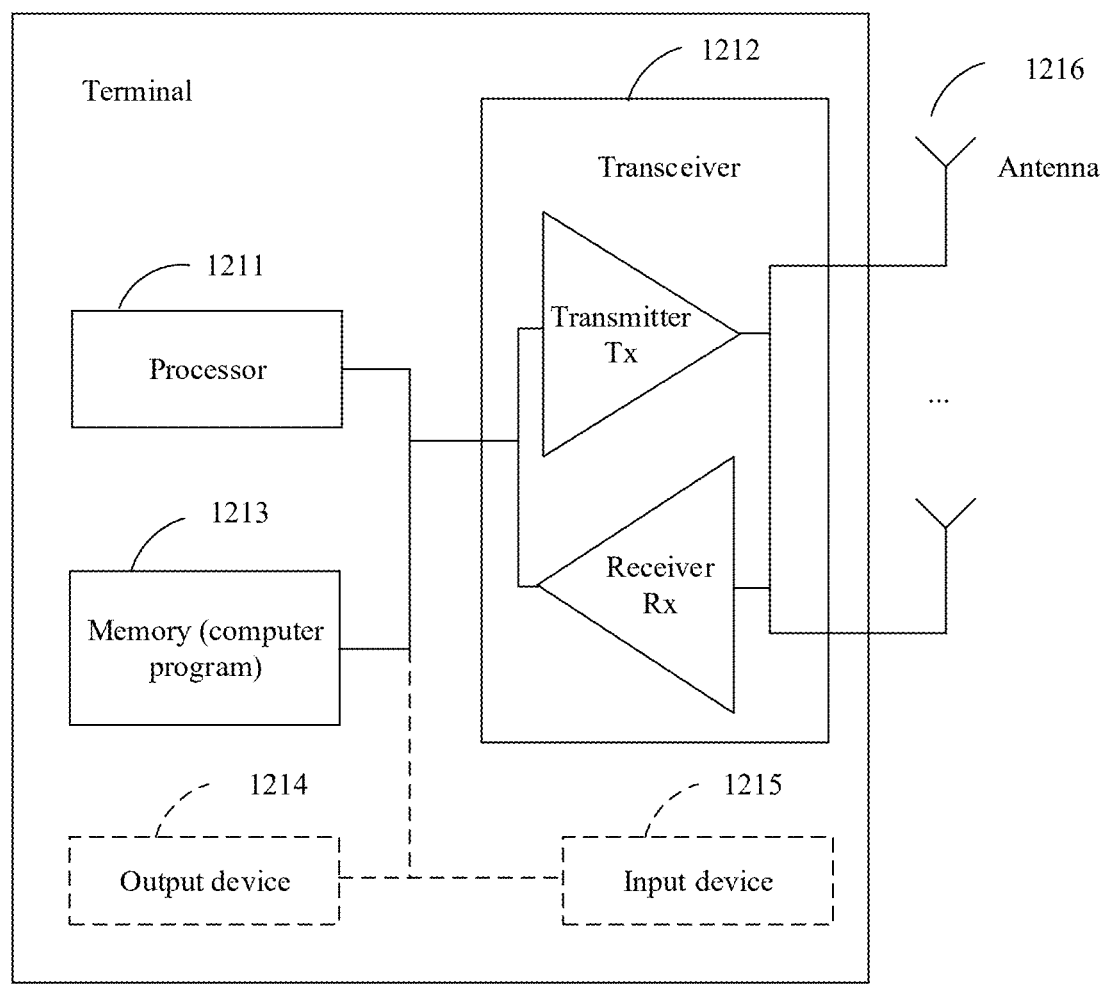
FIG. 11 is an apparatus structural diagram of a terminal according to an embodiment of this application.

FIG. 11 is a schematic diagram of a structure of a first device according to an embodiment of this application. The first device may be, for example, a terminal.

The terminal includes at least one processor 1211 and at least one transceiver 1212. In a possible example, the terminal may further include at least one memory 1213, an output device 1214, an input device 1215, and one or more antennas 1216. The processor 1211, the memory 1213, and the transceiver 1212 are connected to each other. The antenna 1216 is connected to the transceiver 1212, and the output device 1214 and the input device 1215 are connected to the processor 1211.

The memory 1213 may exist independently, and is connected to the processor 1211. In another example, the memory 1213 may be integrated with the processor 1211, for example, integrated into a chip. The memory 1213 can store program code for executing the technical solutions in embodiments of this application, and the processor 1211 controls the execution. Various types of executed computer program code may also be considered as drivers of the processor 1211. For example, the processor 1211 is configured to execute the computer program code stored in the memory 1213, to implement the technical solutions in embodiments of this application.

The transceiver 1212 may be configured to support receiving or sending of a radio frequency signal between terminals, between a terminal and a network device, or between a terminal and another device. The transceiver 1212 may be connected to the antenna 1216. The transceiver 1212 includes a transmitter Tx and a receiver Rx. In some embodiments, the one or more antennas 1216 may receive a radio frequency signal. The receiver Rx of the transceiver 1212 is configured to: receive the radio frequency signal from the antenna, convert the radio frequency signal into a digital baseband signal or a digital intermediate frequency signal, and provide the digital baseband signal or the digital intermediate frequency signal for the processor 1211, so that the processor 1211 further processes the digital baseband signal or the digital intermediate frequency signal, for example, performs demodulation processing and decoding processing. In addition, the transmitter Tx of the transceiver 1212 is further configured to: receive a modulated digital baseband signal or a modulated digital intermediate frequency signal from the processor 1211, convert the modulated digital baseband signal or the digital intermediate frequency signal into a radio frequency signal, and send the radio frequency signal through the one or more antennas 1216. In some embodiments, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or the modulated digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal.

The processor 1211 may be configured to implement various functions for the terminal, for example, configured to process a communication protocol and communication data, or configured to: control the entire terminal device, execute a software program, and process data of the software program, or configured to assist in completing a computing processing task, for example, graphics and image processing or audio processing. Alternatively, the processor 1211 is configured to implement one or more of the foregoing functions.

The output device 1214 communicates with the processor 1211, and may display information in a plurality of manners. For example, the output device 1214 may be a liquid crystal display (LCD), a light emitting diode (LED) display device, a cathode ray tube (CRT) display device, or a projector. The input device 1215 communicates with the processor 1211, and may receive an input of a user in a plurality of manners. For example, the input device 1215 may be a mouse, a keyboard, a touchscreen device, or a sensing device.

An embodiment of this application further provides a computer-readable storage medium that stores a computer program. When the computer program is executed by a computer, the computer is enabled to perform the foregoing diversity communication method. In other words, the computer program includes instructions for implementing the foregoing diversity communication method.

An embodiment of this application further provides a computer program product, including computer program code. When the computer program code is run on a computer, the computer is enabled to perform the diversity communication method provided above.

An embodiment of this application further provides a communication system. The communication system includes a terminal and a network device that perform the foregoing diversity communication method.

In addition, the processor mentioned in embodiments of this application may be a central processing unit (CPU) or a baseband processor, where the baseband processor and the CPU may be integrated or separated, or may be a network processor (NP) or a combination of a CPU and an NP. The processor may further include a hardware chip or another general-purpose processor. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL) and another programmable logic device, a discrete gate or a transistor logic device, a discrete hardware component, or the like, or any combination thereof. The general-purpose processor may be a microprocessor, or the processor may be any conventional processor or the like.

The memory mentioned in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory described in this application is intended to include but is not limited to these memories and any memory of another proper type.

The transceiver mentioned in embodiments of this application may include an independent transmitter and/or an independent receiver, or a transmitter and a receiver may be integrated. The transceiver may operate according to instructions of a corresponding processor. In some embodiments, the transmitter may correspond to a transmitter machine in a physical device, and the receiver may correspond to a receiver machine in the physical device.

Persons of ordinary skill in the art may be aware that, in combination with the examples described in embodiments disclosed in this specification, method operations and units may be implemented by electronic hardware, computer software, or a combination thereof. To clearly describe the interchangeability between the hardware and the software, the foregoing has generally described operations and compositions of each embodiment according to functions. Whether the functions are performed by hardware or software depends on particular applications and design constraint conditions of the technical solutions. Persons of ordinary skill in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing described system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in embodiments of this application.

In addition, function units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions in this application essentially, or the part contributing to the conventional technology, or all or a part of the technical solutions may be implemented in a form of a software product. The computer software product is stored in a storage medium and includes several instructions for instructing a computer device (which may be a personal computer, a server, a network device, or the like) to perform all or a part of the operations of the methods in embodiments of this application. The foregoing storage medium includes: any medium that can store program code, such as a USB flash drive, a removable hard disk, a read-only memory (ROM), a random access memory (RAM), a magnetic disk, or an optical disc.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

The term "and/or" in this application describes an association relationship for describing associated objects and represents that three relationships may exist. For example, A and/or B may represent the following three cases: only A exists, both A and B exist, and only B exists. The character "/" generally indicates an "or" relationship between the associated objects. "A plurality of" in this application means two or more. In addition, it should be understood that in description of this application, terms such as "first" and "second" are merely used for distinguishing and description, but should not be understood as indicating or implying relative importance, or should not be understood as indicating or implying a sequence.

This application is described with reference to the flowcharts and/or block diagrams of the method, the device (system), and the computer program product according to the embodiments of this application. It should be understood that computer program instructions may be used for implementing each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a computer-readable memory that can instruct the computer or any other programmable data processing device to execute, so that the instructions stored in the computer-readable memory generate an artifact that includes an instruction apparatus. The instruction apparatus implements a function in one or more processes in the flowcharts and/or in one or more blocks in the block diagrams.

The computer program instructions may alternatively be loaded onto a computer or another programmable data processing device, so that a series of operations are performed on the computer or the other programmable device, so that computer-implemented processing is generated. Therefore, the instructions executed on the computer or the other programmable device provide operations for implementing a function in one or more procedures in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Clearly, persons skilled in the art can make various modifications and variations to embodiments of this application without departing from the spirit and scope of embodiments of this application. In this way, this application is intended to cover these modifications and variations to embodiments of this application provided that they fall within the scope of protection defined by the following claims and their equivalent technologies of this application.

What is claimed is:

1. A diversity communication method, wherein the method comprises:
    processing, by a first device, one transport block to generate a plurality of codewords;
    for each one of the plurality of codewords:
        modulating bits in the codeword to obtain a plurality of modulation symbols:
        mapping, by the first device, the plurality of modulation symbols to a plurality of antenna ports, wherein a plurality of consecutive modulation symbols are mapped to one antenna port in each mapping; and
        mapping, by the first device, for each one of the plurality of antenna ports, the plurality of modulation symbols to a frequency domain resource, wherein the frequency domain resource is a frequency domain resource corresponding to the antenna port, and wherein frequency domain resources corresponding to different antenna ports do not overlap.

2. The method according to claim 1, wherein in each mapping, an even number of consecutive modulation symbols are mapped to one antenna port.

3. The method according to claim 1, wherein different codewords correspond to the different antenna ports.

4. The method according to claim 3, wherein one codeword is a redundancy version of the transport block.

5. The method according to claim 1, wherein a frequency domain resource corresponding to each antenna port is inconsecutive; or
    a frequency domain resource corresponding to each antenna port is consecutive.

6. The method according to claim 5, wherein that a frequency domain resource corresponding to each antenna port is inconsecutive comprises any one of the following:
    a plurality of resource elements REs comprised in the frequency domain resource are inconsecutive;
    a plurality of precoding resource block groups PRGs comprised in the frequency domain resource are inconsecutive; or
    a plurality of physical resource blocks PRBs comprised in the frequency domain resource are inconsecutive.

7. The method according to claim 1, further comprising:
    receiving, by the first device, a first indication, wherein the first indication indicates a mapping manner of mapping the plurality of modulation symbols to the frequency domain resource.

8. The method according to claim 1, further comprising:
    receiving, by the first device, one or more demodulation reference signal DMRS port identifiers.

9. The method according to claim 8, wherein when a plurality of DMRS port identifiers are received, the frequency domain resource comprises a plurality of inconsecutive resource elements REs; or
    when one DMRS port identifier is received, the frequency domain resource corresponding to each antenna port is consecutive; or the frequency domain resource comprises a plurality of inconsecutive precoding resource block groups PRGs; or the frequency domain resource comprises a plurality of inconsecutive physical resource blocks PRBs.

10. The method according to claim 1, further comprising:
receiving, by the first device, information about one or more sub-bands, wherein the information about the sub-band is used for determining the frequency domain resource corresponding to the one antenna port, and wherein, when the information about the sub-band is received, the frequency domain resource corresponding to each antenna port is consecutive.

11. A diversity communication apparatus, wherein the apparatus comprises:
a processing module, configured to:
process one transport block to generate a plurality of codewords;
for each one of the plurality of codewords:
modulate bits in the codeword to obtain a plurality of modulation symbols;
map the plurality of modulation symbols to a plurality of antenna ports, wherein a plurality of consecutive modulation symbols are mapped to one antenna port in each mapping; and
map, for each one of the plurality of antenna ports, the plurality of modulation symbols to a frequency domain resource, wherein the frequency domain resource is a frequency domain resource corresponding to the antenna port, and wherein frequency domain resources corresponding to different antenna ports do not overlap; and
a transceiver module, configured to send the modulation symbols mapped to the frequency domain resource corresponding to each antenna port.

12. The apparatus according to claim 11, wherein in each mapping, an even number of consecutive modulation symbols are mapped to one antenna port.

13. The apparatus according to claim 11, wherein different codewords correspond to the different antenna ports.

14. The apparatus according to claim 13, wherein one codeword is a redundancy version of the transport block.

15. The apparatus according to claim 11, wherein a frequency domain resource corresponding to each antenna port is inconsecutive; or
a frequency domain resource corresponding to each antenna port is consecutive.

16. The apparatus according to claim 15, wherein that a frequency domain resource corresponding to each antenna port is inconsecutive comprises any one of the following:

a plurality of resource elements REs comprised in the frequency domain resource are inconsecutive;
a plurality of precoding resource block groups PRGs comprised in the frequency domain resource are inconsecutive; or
a plurality of physical resource blocks PRBs comprised in the frequency domain resource are inconsecutive.

17. The apparatus according to claim 11, wherein the transceiver module is further configured to receive a first indication, wherein the first indication indicates a mapping manner of mapping the plurality of modulation symbols to the frequency domain resource.

18. The apparatus according to claim 11, wherein the transceiver module is further configured to receive one or more demodulation reference signal DMRS port identifiers.

19. The apparatus according to claim 18, wherein when a plurality of DMRS port identifiers are received, the frequency domain resource comprises a plurality of inconsecutive resource elements REs; or
when one DMRS port identifier is received, the frequency domain resource corresponding to each antenna port is consecutive; or the frequency domain resource comprises a plurality of inconsecutive precoding resource block groups PRGs; or the frequency domain resource comprises a plurality of inconsecutive physical resource blocks PRBs.

20. A communication apparatus, comprising:
a processor; and
a memory to store instructions that, when executed by the processor, cause the processor to:
process one transport block to generate a plurality of codewords;
for each one of the plurality of codewords:
modulate bits in the codeword to obtain a plurality of modulation symbols;
map the plurality of modulation symbols to a plurality of antenna ports, wherein a plurality of consecutive modulation symbols are mapped to one antenna port in each mapping; and
map, for each one of the plurality of antenna ports, the plurality of modulation symbols to a frequency domain resource, wherein the frequency domain resource is a frequency domain resource corresponding to the antenna port, and wherein frequency domain resources corresponding to different antenna ports do not overlap.

* * * * *